United States Patent
Lim et al.

(10) Patent No.: US 10,349,283 B2
(45) Date of Patent: Jul. 9, 2019

(54) METHOD FOR TRANSCEIVING SIGNAL IN WIRELESS LAN SYSTEM AND APPARATUS THEREFOR

(71) Applicant: LG ELECTRONICS INC., Seoul (KR)

(72) Inventors: Dongguk Lim, Seoul (KR); Jinyoung Chun, Seoul (KR); Jinsoo Choi, Seoul (KR); Hangyu Cho, Seoul (KR); Jinmin Kim, Seoul (KR); Eunsung Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/569,035

(22) PCT Filed: Dec. 4, 2015

(86) PCT No.: PCT/KR2015/013222
§ 371 (c)(1),
(2) Date: Oct. 24, 2017

(87) PCT Pub. No.: WO2017/022897
PCT Pub. Date: Feb. 9, 2017

(65) Prior Publication Data
US 2018/0132109 A1    May 10, 2018

Related U.S. Application Data

(60) Provisional application No. 62/199,250, filed on Jul. 31, 2015.

(51) Int. Cl.
*H04W 16/10* (2009.01)
*H04W 72/04* (2009.01)
(Continued)

(52) U.S. Cl.
CPC ............ *H04W 16/10* (2013.01); *H04L 1/00* (2013.01); *H04L 27/2602* (2013.01);
(Continued)

(58) Field of Classification Search
CPC ..... H04W 16/10; H04W 28/06; H04W 52/34; H04W 52/283; H04W 72/04;
(Continued)

(56) References Cited

U.S. PATENT DOCUMENTS 8,885,495 B1    11/2014    Liu et al.
9,042,331 B2 *    5/2015    Lee ............... H04B 7/0452
                                                370/329
(Continued)

*Primary Examiner* — Tri H Phan
(74) *Attorney, Agent, or Firm* — Birch, Stewart, Kolasch & Birch, LLP

(57) ABSTRACT

A method for receiving, by a station (STA), a signal in a wireless LAN system comprises: a step of receiving a frame which includes a SIG-A field including MCS information for a SIG-B field, and the SIG-B field encoded on the basis of any one MCS set among from multiple MCS sets; and a step of decoding the SIG-B field on the basis of the MCS information included in the SIG-A field, wherein a specific value in the MCS information indicating a first MCS level of a first MCS set from among the multiple MCS sets is re-used to indicate a second MCS level of a second MCS set, and which MCS level of the first MCS level and the second MCS level indicated by the specific value is set in the SIG-B field is implicitly indicated by a status of a channel on which the frame is received.

10 Claims, 18 Drawing Sheets

(51) Int. Cl.
*H04W 72/12* (2009.01)
*H04W 76/20* (2018.01)
*H04L 1/00* (2006.01)
*H04W 52/28* (2009.01)
*H04L 27/26* (2006.01)
*H04W 28/06* (2009.01)
*H04W 52/34* (2009.01)

(52) U.S. Cl.
CPC ..... *H04W 52/283* (2013.01); *H04W 72/0473* (2013.01); *H04W 72/1205* (2013.01); *H04W 76/20* (2018.02); *H04W 28/06* (2013.01); *H04W 52/34* (2013.01)

(58) Field of Classification Search
CPC ............. H04W 72/0473; H04W 72/12; H04W 72/1205; H04W 76/20; H04L 1/00; H04L 27/2602
See application file for complete search history.

(56) References Cited

U.S. PATENT DOCUMENTS

| | | | |
|---|---|---|---|
| 9,344,238 B2* | 5/2016 | Vermani | H04L 5/0044 |
| 9,585,057 B2* | 2/2017 | Seok | H04W 28/06 |
| 9,998,185 B2* | 6/2018 | Hedayat | H04B 7/0452 |
| 10,027,449 B2* | 7/2018 | Sun | H04L 27/2602 |
| 2013/0286925 A1 | 10/2013 | Fischer et al. | |
| 2014/0140312 A1 | 5/2014 | Lee et al. | |
| 2014/0307649 A1 | 10/2014 | Vermani et al. | |
| 2015/0156672 A1 | 6/2015 | Seok et al. | |
| 2016/0043785 A1* | 2/2016 | Park | H04B 7/0452 375/267 |
| 2018/0048427 A1* | 2/2018 | Lou | H04L 1/0079 |
| 2018/0109300 A1* | 4/2018 | Choi | H04L 5/0007 |
| 2018/0131553 A1* | 5/2018 | Choi | H04L 5/02 |

* cited by examiner

FIG. 18

| | B0 B1 | B2 | B3 | B4 B9 | B10 B12 | B13 B15 | B16 B18 | B19 B21 | B22 | B23 |
|---|---|---|---|---|---|---|---|---|---|---|
| Composite Name: | | Reserved | STBC | Group ID | NSTS/Partial AID | | | | TXOP PS NOT ALLOWED | Reserved |
| SU Name: | BW | Reserved | STBC | Group ID | SU NSTS | Partial AID | | | TXOP PS NOT ALLOWED | Reserved |
| MU Name: | BW | Reserved | STBC | Group ID | MU[0] NSTS | MU[1] NSTS | MU[2] NSTS | MU[3] NSTS | TXOP PS NOT ALLOWED | Reserved |
| Bits: | 2 | 1 | 1 | 6 | 3 | 3 | 3 | 3 | 1 | 1 |

(a)

| | B0 | B1 | B2 | B3 | B4 | B5 | B6 | B7 | B8 | B9 | B10 B17 | B18 B23 |
|---|---|---|---|---|---|---|---|---|---|---|---|---|
| Composite Name: | Short GI | Short GI NSYM Disambiguation | SU/MU[0] Coding | LDPC Extra OFDM symbol | SU VHT-MCS/MU[1-3] Coding | | | | Beam-formed | Reserved | CRC | Tail |
| SU Name: | Short GI | Short GI NSYM Disambiguation | SU/MU[0] Coding | LDPC Extra OFDM symbol | SU VHT-MCS | | | | Beam-formed | Reserved | CRC | Tail |
| MU Name: | Short GI | Short GI NSYM Disambiguation | SU/MU[0] Coding | LDPC Extra OFDM symbol | MU[1] Coding | MU[2] Coding | MU[3] Coding | Reserved | Reserved | Reserved | CRC | Tail |
| Bits: | 1 | 1 | 1 | 1 | 1 | 1 | 1 | 1 | 1 | 1 | 8 | 6 |

| Octets: 2 | 2 | 6 | 6 | 6 | 2 | 6 | 2 | 4 | 0-11426 | 4 |
|---|---|---|---|---|---|---|---|---|---|---|
| Frame Control | Duration /ID | Address 1 | Address 2 | Address 3 | Sequence Control | Address 4 | QoS Control | HT Control | Frame Body | FCS |

MAC header

FIG. 20

| | B1<br>B15 | B16<br>B17 | B18<br>B19 | B20<br>B21 | B22<br>B23 | B24 | B25 B29 | B30 | B31 |
|---|---|---|---|---|---|---|---|---|---|
| VHT=0 | Link Adaptation Control | Calibration Position | Calibration Sequence | Reserved | CSI/Steering | NDP Announcement | Reserved | AC Constraint | RDG/More PPDU |
| Bits: 1 | 15 | 2 | 2 | 2 | 2 | 1 | 5 | 1 | 1 |

(a)

| B1 | B2<br>B5 | B6<br>B8 | B9<br>B15 |
|---|---|---|---|
| TRQ | MAI | MFSI | MFB/ASELC |
| 1 | 4 | 3 | 7 |

| B1 | B2 | B3<br>B5 | B6 B8 | B9 B23 | B24 B26 | B27 | B28 | B29 | B30 | B31 |
|---|---|---|---|---|---|---|---|---|---|---|
| VHT=1 | Reserved | MRQ | MSI | MFSI/GID-L | MFB | GID-H | Coding Type | FB Tx Type | Unsolicited MFB | AC Constraint | RDG/More PPDU |
| Bits: 1 | 1 | 1 | 3 | 3 | 15 | 3 | 1 | 1 | 1 | 1 | 1 |

(a)

| B9<br>B11 | B12<br>B15 | B16<br>B17 | B16<br>B23 |
|---|---|---|---|
| VHT N_STS | MCS | BW | SNR |
| 3 | 4 | 2 | 6 |

| Frame Control | A1 | A2 | Sequence Control | A3 | A4 | Frame Body | FCS |
|---|---|---|---|---|---|---|---|
| 2 | 2 or 6 | 6 or 2 | 0 or 2 | 0 or 6 | 0 or 6 | variable | 4 |

Octets:

(a)

| B0 B1 | B2 B4 | B5 B7 | B8 | B9 | B10 | B11 | B12 | B13 | B14 | B15 |
|---|---|---|---|---|---|---|---|---|---|---|
| Protocol Version | Type | PTID/ Subtype | From DS | More Fragments | Power Management | More Data | Protected Frame | End of Service Period | Relayed Frame | Ack Policy |
| 2 | 3 | 3 | 1 | 1 | 1 | 1 | 1 | 1 | 1 | 1 |

Bits:

(b)

FIG. 23B
40 MHz
80 MHz
160 MHz

FIG. 24
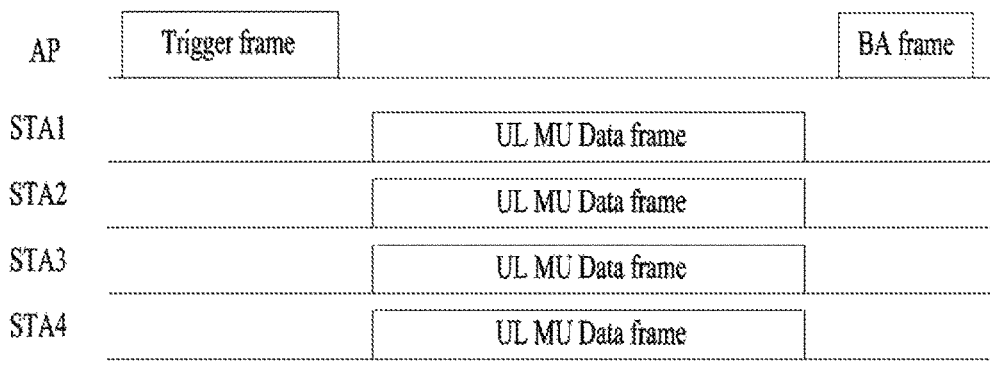
FIG. 25
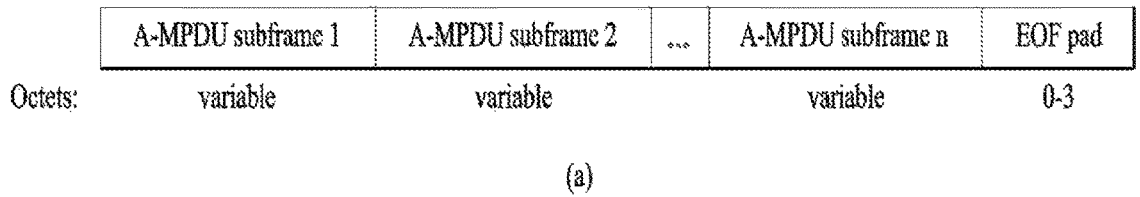
(a)
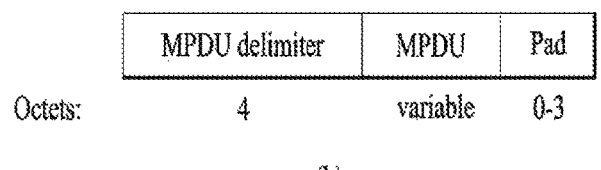
(b)
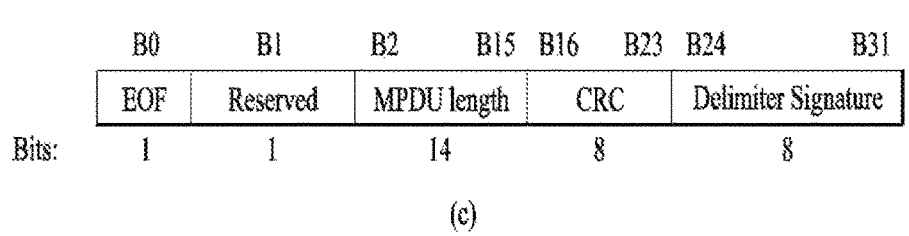
(c)

METHOD FOR TRANSCEIVING SIGNAL IN WIRELESS LAN SYSTEM AND APPARATUS THEREFOR

CROSS REFERENCE TO RELATED APPLICATIONS

This application is the National Phase of PCT International Application No. PCT/KR2015/013222, filed on Dec. 4, 2015, which claims priority under 35 U.S.C. 119(e) to U.S. Provisional Application No. 62/199,250, filed on Jul. 31, 2015, all of which are hereby expressly incorporated by reference into the present application.

TECHNICAL FIELD

The present invention relates to a wireless LAN system, and more particularly, to a method for transmitting or receiving an encoded signal in a wireless LAN system and a status for performing the same.

BACKGROUND ART

While a signal transmission method proposed below is applicable to various types of wireless communication, a Wireless Local Area Network (WLAN) system will be described as an exemplary system to which the present disclosure is applicable.

WLAN Standards have been developed as Institute of Electrical and Electronics Engineers (IEEE) 802.11. IEEE 802.11a and b use an unlicensed band at 2.4 GHz or 5 GHz. IEEE 802.11b provides a transmission rate of 11 Mbps and IEEE 802.11a provides a transmission rate of 54 Mbps. IEEE 802.11g provides a transmission rate of 54 Mbps by applying Orthogonal Frequency Division Multiplexing (OFDM) at 2.4 GHz. IEEE 802.11n provides a transmission rate of 300 Mbps for four spatial streams by applying Multiple Input Multiple Output (MIMO)-OFDM. IEEE 802.11n supports a channel bandwidth of up to 40 MHz and, in this case, provides a transmission rate of 600 Mbps.

The above-described WLAN standards have evolved into IEEE 802.11ac that uses a bandwidth of up to 160 MHz and supports a transmission rate of up to 1 Gbits/s for 8 spatial streams and IEEE 802.11ax standards are under discussion.

DISCLOSURE

Technical Problem

An object of the present invention is to provide a method for efficiently transmitting or receiving an encoded signal in a wireless LAN system.

The technical objects that can be achieved through the present invention are not limited to what has been particularly described hereinabove and other technical objects not described herein will be more clearly understood by persons skilled in the art from the following detailed description.

Technical Solution

To achieve the object of the present invention, a method for receiving, by a station (STA), a signal in a wireless LAN system according to one aspect of the present invention comprises receiving a frame which includes a SIG-A field including MCS information for a SIG-B field and the SIG-B field encoded based on any one of a plurality of MCS sets; and decoding the SIG-B field based on the MCS information included in the SIG-A field, wherein a specific value of the MCS information indicating a first MCS level of a first MCS set among the plurality of MCS sets is reused to indicate a second MCS level of a second MCS set, and which one of the first MCS level and the second MCS level indicated by the specific value is set in the SIG-B field is implicitly indicated by a status of a channel through which the frame is received.

To achieve the object of the present invention, a method for transmitting, by a station (STA), a signal in a wireless LAN system according to another aspect of the present invention comprises encoding a SIG-B field based on any one of a plurality of MCS sets; and transmitting a frame which includes a SIG-A field including MCS information for the SIG-B field and the encoded SIG-B field, wherein a specific value of the MCS information indicating a first MCS level of a first MCS set among the plurality of MCS sets is reused to indicate a second MCS level of a second MCS set, and which one of the first MCS level and the second MCS level indicated by the specific value is set in the SIG-B field is implicitly indicated by a status of a channel through which the frame is received.

To achieve the object of the present invention, a station (STA) according to still another aspect of the present invention comprises a receiver for receiving a frame which includes a SIG-A field including MCS information for a SIG-B field and the SIG-B field encoded based on any one of a plurality of MCS sets; and a processor for decoding the SIG-B field based on the MCS information included in the SIG-A field, wherein a specific value of the MCS information indicating a first MCS level of a first MCS set among the plurality of MCS sets is reused to indicate a second MCS level of a second MCS set, and which one of the first MCS level and the second MCS level indicated by the specific value is set in the SIG-B field is implicitly indicated by a status of a channel through which the frame is received.

Preferably, the first MCS set may be used at a first channel status, and the second MCS set may be used at a second channel status.

Preferably, the status of the channel may indicate an indoor status or an outdoor status.

Preferably, the status of the channel may be estimated based on at least one of repetition of SIG-A field within the frame, a length of LTF (long training field) of the frame, a polarity of RL-SIG field where L-SIG field is repeated in the frame, nominal transmission power information of the frame, and a payload GI (guard interval) length of the frame.

More preferably, the channel status may be estimated as an outdoor status if the SIG-A field is repeated or the LTF is set to four times of a unit length, the RL-SIG field has a first polarity, the transmission power information exceeds an indoor power level, or the payload GI is set to one time of a unit length.

Advantageous Effects

According to one embodiment of the present invention, different MCS sets may dynamically be varied depending on a channel status, whereby a signal may have a robust characteristic or may be transmitted at high performance. The MCS sets may be identified implicitly, whereby signaling overhead may be reduced.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

FIGS. 14 to 18 are diagrams illustrating an example of a frame structure used in an IEEE 802.11 system.

FIGS. 19 to 21 are diagrams illustrating an MAC frame format.

FIG. 22 is a diagram illustrating a short MAC frame format.

FIG. 23B is a diagram illustrating a HE-SIG-B field structure of HE PPDU.

FIG. 24 is a diagram illustrating a method for performing uplink multi-user (UL MU) transmission in an AP station and a non-AP station.

FIG. 25 is a diagram illustrating an A-MPDU (Aggregate-MPDU) frame structure for UL MU transmission.

BEST MODE FOR CARRYING OUT THE INVENTION

Figure 1:
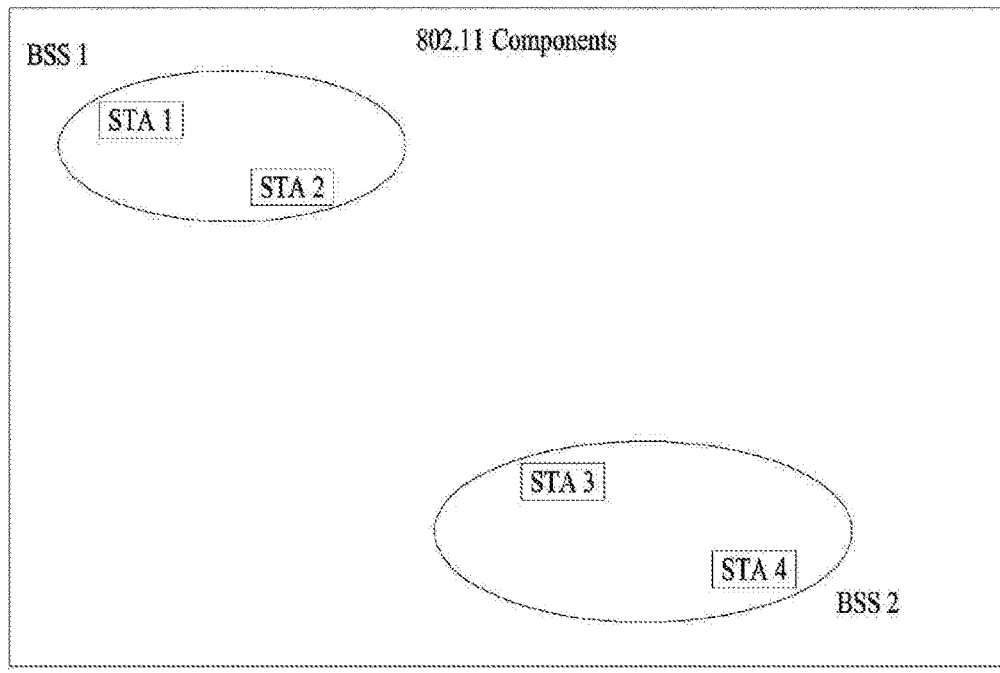
FIG. 1 is a diagram illustrating an exemplary configuration of a Wireless Local Area Network (WLAN) system.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Embodiments described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

Specific terms used in the embodiments of the present invention are provided to aid in understanding of the present invention. These specific terms may be replaced with other terms within the scope and spirit of the present invention.

In some cases, to prevent the concept of the present invention from being obscured, structures and apparatuses of the known art will be omitted, or will be shown in the form of a block diagram based on main functions of each structure and apparatus. In addition, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. For clarity, this application focuses on the IEEE 802.11 system. However, the technical features of the present invention are not limited thereto.

In the present disclosure, a terminology, each of which includes such an ordinal number as 1st, 2nd and the like, may be used to describe various components. In doing so, the various components should be non-limited by the corresponding terminologies, respectively. The terminologies are only used for the purpose of discriminating one component from other components. For example, a first configuration element can be referred to as a second configuration element, similarly, the second configuration element can be referred to as the first configuration element while not being deviated from the scope of right according to the concept of the present specification.

In the present application, such a terminology as 'comprise', 'include' and the like should be construed not as excluding existence of a different configuration element but as designating further existence of a different configuration element. In this disclosure, such a terminology as '. . . unit', '. . . part' corresponds to a unit for processing at least one or more functions or operations. The unit can be implemented by a combination of hardware and/or software.

FIG. 1 is a view illustrating an exemplary configuration of a Wireless Local Area Network (WLAN) system.

As depicted in FIG. 1, a wireless local area network includes at least one Basic Service Set (BSS). The BSS is a set of Stations (STA) capable of communicating with each other by successfully performing synchronization.

The STA is a logical entity including a physical layer interface for a Medium Access Control (MAC) and wireless media. The STA includes an Access Point (AP) and a Non-AP STA. A mobile terminal operated by a user corresponds to the Non-AP STA among the STAs. If it is simply called an STA, the STA may correspond to the Non-AP STA. The Non-AP STA can be called such a different name as a terminal, a Wireless Transmit/Receive Unit (WTRU), User Equipment (UE), a Mobile Station (MS), a Mobile Terminal, a Mobile Subscriber Unit, or the like.

And, the AP is an entity providing an STA associated to the AP with an access to a Distribution System (DS) via the wireless media. The AP can be called a concentrated controller, a Base Station (BS), a Node-B, a Base Transceiver System (BTS), a site controller, or the like.

The BSS can be divided into an infrastructure BSS and an Independent BSS (IBSS).

The BSS depicted in FIG. 1 corresponds to the IBSS. The IBSS means the BSS not including an AP. Since the IBSS does not include the AP, an access to the DS is not permitted to the IBSS. Thus, the IBSS forms a self-contained network.

Figure 2:
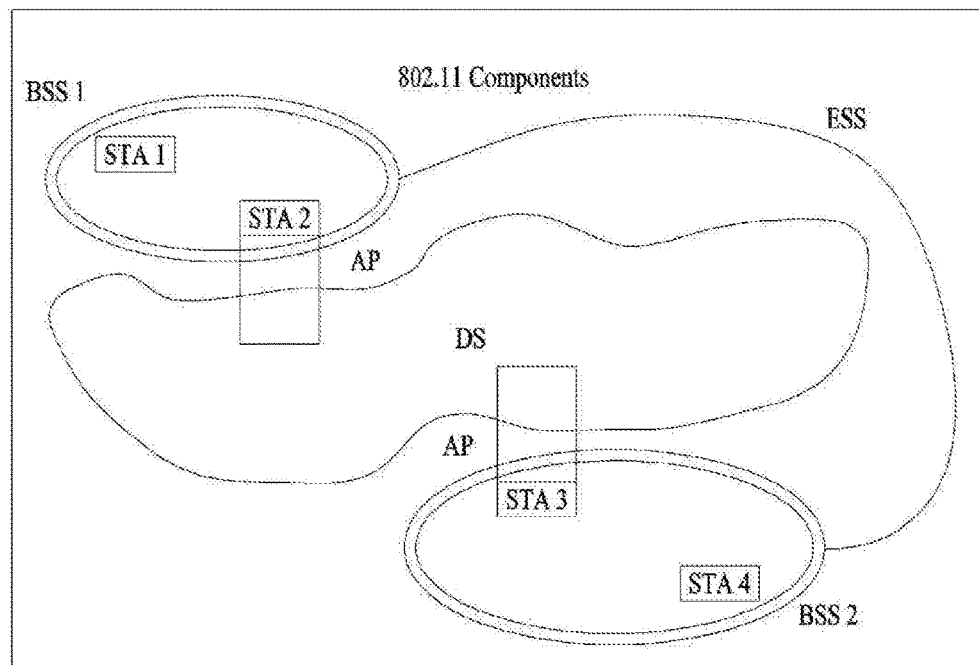
FIG. 2 is a diagram illustrating another exemplary configuration of a WLAN system.

FIG. 2 is a view illustrating another exemplary configuration of a WLAN system.

The BSS depicted in FIG. 2 corresponds to the infrastructure BSS. The infrastructure BSS includes at least one STA and an AP. Although a principle of a communication between non-AP STAs is to perform the communication via the AP, if a link is directly established between the non-AP STAs, it is possible to directly communicate between the non-AP STAs.

As depicted in FIG. 2, a plurality of infrastructure BSSs can be connected to each other via the DS. A plurality of the infrastructure BSSs connected through the DS is called an Extended Service Set (ESS). STAs included in the ESS can communicate with each other and a non-AP STA can move from one BSS to another BSS while seamlessly communicating in an identical ESS.

The DS is a mechanism connecting a plurality of APs to each other and the DS is not necessarily to be a network. If the DS is able to provide a prescribed distribution service, there is no limit on a form of the DS. For instance, the DS may correspond to such a wireless network as a mesh network or may correspond to a physical structure connecting APs to each other.

Figure 3:
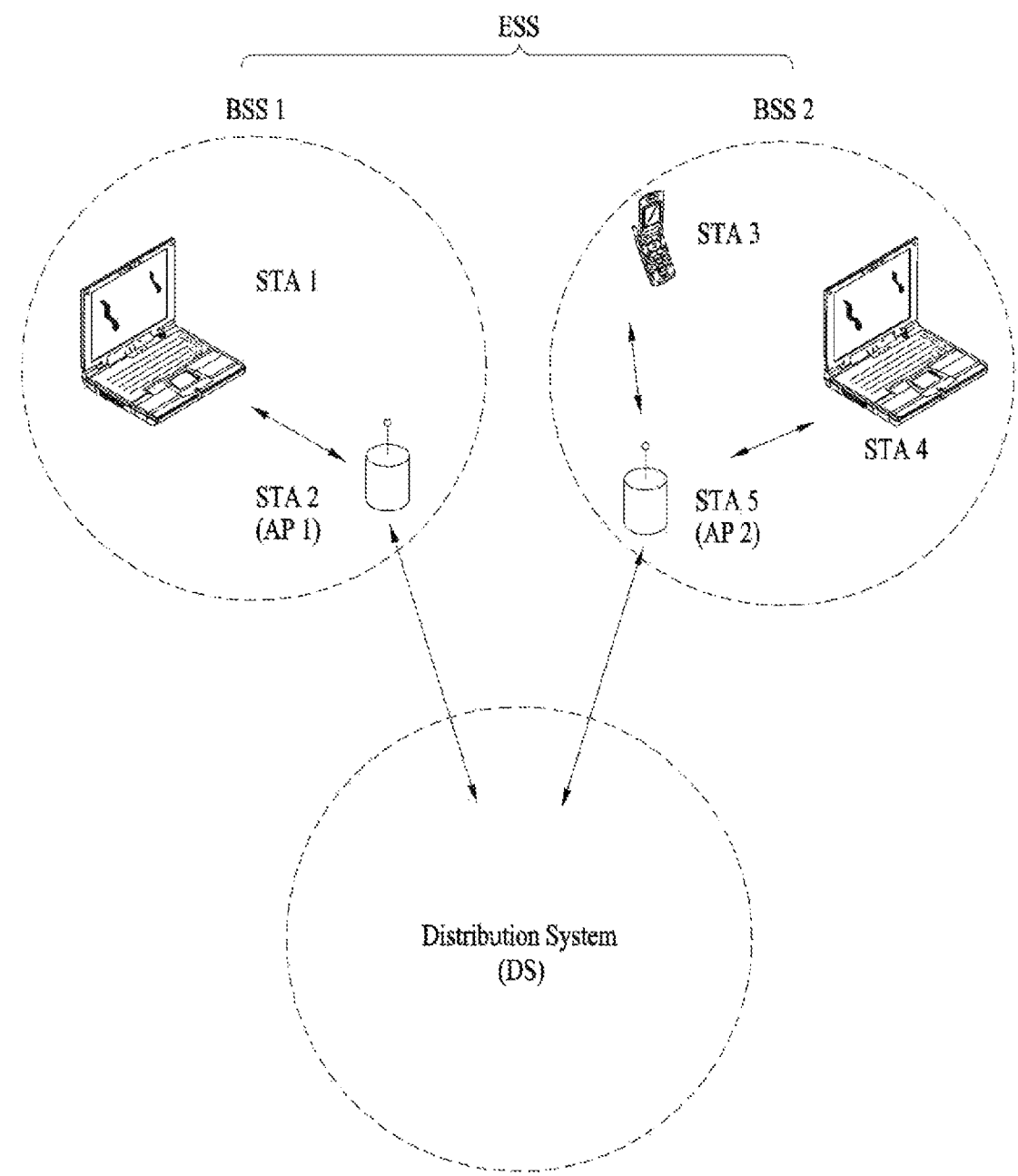
FIG. 3 is a diagram illustrating an exemplary structure of a WLAN system.

FIG. 3 is a view illustrating an exemplary structure of a WLAN system. In FIG. 3, an example of an infrastructure BSS including a DS is described.

Referring to an example of FIG. 3, ESS includes a BSS1 and BSS2. In a WlAN system, a station corresponds to a device operating according to MAC/PHY regulation of IEEE 802.11. A station includes an AP station and a non-AP station. In general, the non-AP station corresponds to such a device directly handled by a user as a laptop computer, a mobile phone, and the like. In the example of FIG. 3, a station 1, a station 3, and a station 4 correspond to the non-AP station and a station 2 and a station 5 correspond to the AP station.

In the following description, the non-AP station may be referred to as a terminal, a Wireless Transmit/Receive Unit (WTRU), a User Equipment (UE), a Mobile Station (MS), a mobile terminal, a Mobile Subscriber Station (MSS), and the like. And, the AP corresponds to a Base Station (BS), a Node-B, an evolved Node-B (eNB), a Base Transceiver System (BTS), a femto BS, and the like.

Figure 4:
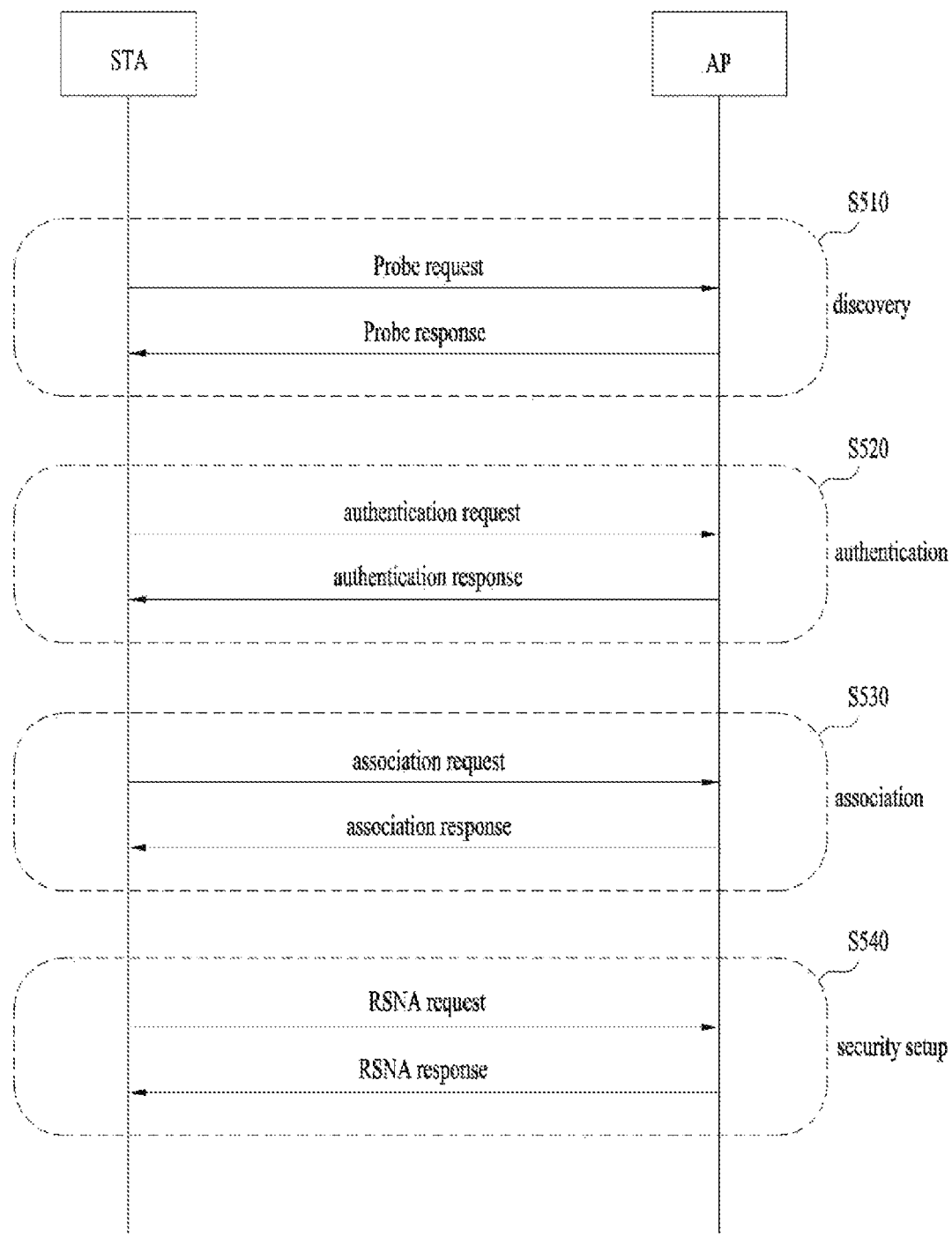
FIG. 4 is a diagram illustrating a link setup procedure in a WLAN system.
Figure 5:
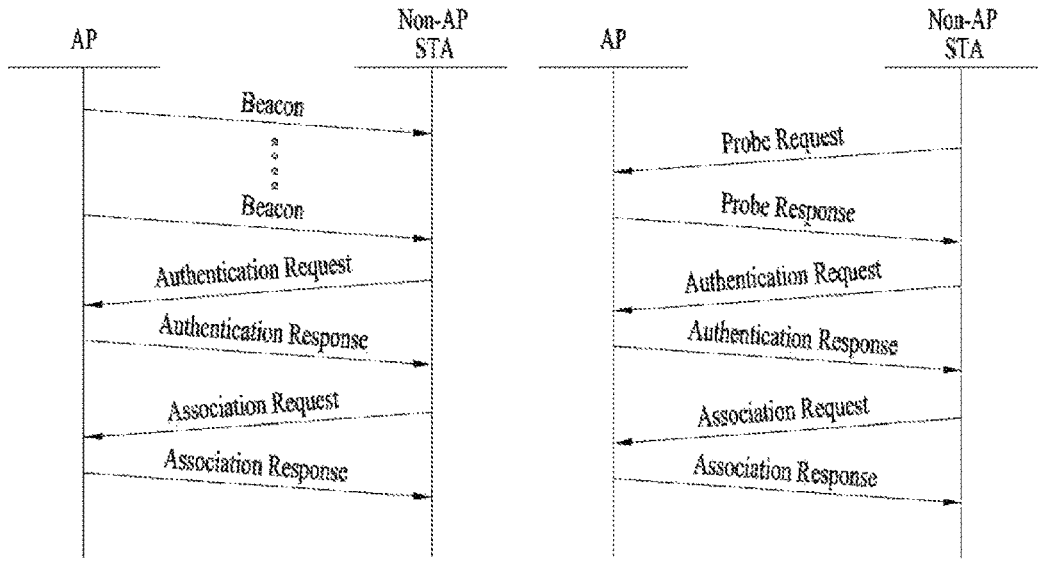
FIG. 5 is a diagram illustrating an active scanning and passive scanning method.

FIG. 4 is a flowchart illustrating a link setup procedure in a WEAN system, and FIG. 5 is a view illustrating an active scanning method and a passive scanning method.

In order for an STA to set up a link with a network and transceive data with the network, it is necessary for the station to discover the network, perform authentication, establish association, and pass through an authentication procedure for security. The link setup procedure can also be referred to as a session initiation procedure or a session setup procedure. And, discovery, authentication, association, and security setup procedures of the link setup procedure can be commonly called an association procedure.

An example of the link setup procedure is explained in the following with reference to FIG. 4.

In the step S410, an STA can perform a network discovery operation. The network discovery operation can include a scanning operation of the STA. In particular, in order for the STA to access a network, it is necessary for the STA to find out a network in which the STA is able to participate. The STA needs to identify a compatible network before participating in a wireless network. A procedure of identifying a network existing at a specific region is called scanning.

A scanning scheme includes active scanning and passive scanning. In FIG. 4, although a network discovery operation including an active scanning procedure is explained for example, an STA may operate with a passive scanning procedure.

According to the active scanning, a scanning performing STA transmits a probe request frame to a responder to discover an AP existing in the vicinity of the STA and waits for a response. The responder transmits a probe response frame to the STA, which has transmitted the probe request frame, in response to the probe request frame. In this case, the responder may correspond to an STA, which has lastly transmitted a beacon frame in a BSS on a channel being scanned. In the BSS, since an AP transmits a beacon frame, the AP becomes the responder. In an IBSS, since STAs in the IBSS alternately transmit a beacon, the responder is not fixed. For example, if an STA transmits a probe request frame on a channel 1 and receives a probe response frame on the channel 1, the STA stores BSS-related information included in the received probe response frame, moves to a next channel (e.g., a channel 2), and may be able to perform scanning, (i.e., transmit and receive a probe request/response on the channel 2) using an identical method.

Referring to FIG. 5, scanning can also be performed by a passive scanning scheme. According to the passive scanning, a scanning performing STA waits for a beacon frame while switching, a channel. A beacon frame is one of management frames in IEEE 802.11. The beacon frame is periodically transmitted to notify the existence of a wireless network and make the scanning performing STA discover and participate in the wireless network. In a BSS, an AP plays a role in periodically transmitting a beacon frame. In an IBSS, STAs belonging to the IBSS alternately transmit a beacon frame. Having received a beacon frame, the scanning performing STA stores information on the BSS included in the beacon frame and records beacon frame information on each channel while switching to a different channel. Having received a beacon frame, an STA stores BSS-related information included in the received beacon frame, moves to a next channel, and may be able to perform scanning on the next channel using an identical method.

When the active scanning and the passive scanning are compared, the active scanning has a merit in that delay is less and power consumption is lower compared to the passive scanning.

After the network is discovered by the STA, an authentication procedure can be performed in the step S420. In order to clearly distinguish the authentication procedure from a security setup operation of the step S440, the authentication procedure can be referred to as a first authentication procedure.

According to the authentication procedure, the STA transmits an authentication request frame to the AP and the AP transmits an authentication response frame to the STA in response to the authentication request frame. An authentication frame used in the authentication request/response corresponds to a management frame.

The authentication frame include information on an authentication algorithm number, an authentication transaction sequence number, a status code, a challenge text, a Robust Security Network (RSN), a finite cyclic group, and the like. The above-mentioned information is just an example of information capable of being included in the authentication request/response. The information can be replaced with different information or may further include additional information.

The STA can transmit the authentication request frame to the AP. The AP can determine whether to grant authentication on the STA based on the information included in the received authentication request frame. The AP can transmit a result of the authentication procedure to the STA via the authentication response frame.

If the STA is successfully authenticated, an association procedure can be performed in the step S430. According to the association procedure, the STA transmits an association request frame to the AP and the AP transmits an association response frame to the STA in response to the association request frame.

For example, the association request frame can include such information as information related to various capabilities, a beacon listening interval, an SSID (service set identifier), supported rates, supported channels, an RSN, a mobility domain, supported operating classes, a TIM (traffic indication map broadcast request), interworking service capability, and the like.

For example, the association response frame can include such information as information related to various capabilities, a status code, an Association ID (AID), supported rates, an Enhanced Distributed Channel Access (EDCA), a parameter set, a Received Channel Power Indicator (RCPI), a Received Signal to Noise Indicator (RSNI), a mobility domain, a timeout interval (association comeback time), an overlapped BSS scan parameter, TIM broadcasting response, QoS map, and the like.

The above-mentioned information is just an example of information capable of being included in the association request/response frame. The information can be replaced with different information or may further include additional information.

If the STA is successfully associated with the network, the security setup procedure can be performed in the step S540. The security setup procedure of the step S440 can also be referred to as an authentication procedure via an RSNA (robust security network association) request/response. The authentication procedure of the step S520 can be referred to as a first authentication procedure and the security setup procedure of the step S540 can be simply referred to as an authentication procedure.

For example, the security setup procedure of the step S440 may include a private key setup procedure via 4-way handshaking through an Extensible Authentication Protocol over LAN (EAPOL) frame. And, the security setup procedure can also be performed according to a security scheme not defined in IEEE 802.11 standard.

Based on the aforementioned discussion, a collision detection technique in a WLAN system is explained in the following.

As mentioned in the foregoing description, since various elements influence on a channel in wireless environment, a transmitting end is unable to precisely detect a collision. Hence, 802.11 has introduced a Distributed Coordination Function (DCF) corresponding to a Carrier Sense Multiple Access/Collision Avoidance (CSMA/CA) mechanism.

Figure 6:
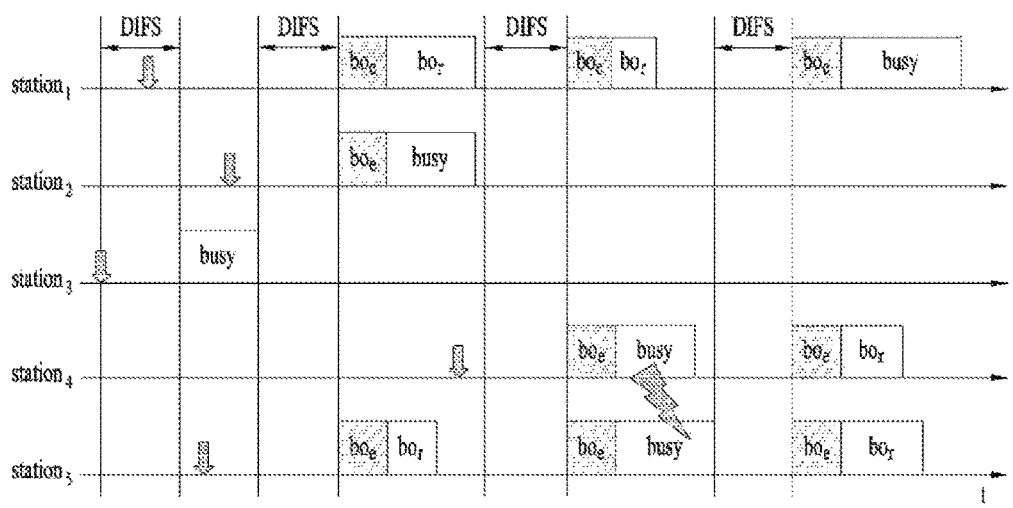
FIG. 6 is a diagram illustrating a Distributed Coordinated Function (DCF) mechanism in a WLAN system.

FIG. 6 is a view illustrating a DCF mechanism in a WLAN system.

A DCF performs Clear Channel Assessment (CCA) that senses a medium during a specific period (e.g., DIFS: DCF inter-frame space) before data is transmitted by STAs including data to be transmitted. In this case, if a medium is idle (available), an STA can transmit a signal using the medium. However, if a medium is busy (unavailable), an STA can transmit data after waiting for a period as much as a random backoff period in addition to a DIFS under an assumption that many STAs are waiting for the use of the medium. In this case, the random backoff period plays a role in avoiding a collision. If it is assumed that there are many STAs to transmit data, each of the STAs has a statistically different backoff interval value. Consequently, each of the STAs has different transmission timing. If an STA starts to transmit data using the medium, other STAs are unable to use the medium.

A random backoff time and a procedure are briefly explained in the following.

If a state of a specific medium is switched to idle from busy, a plurality of STAs start to prepare for data transmission. In this case, in order to minimize collision, each of a plurality of the STAs intending to transmit data selects a random backoff count and waits for slot time as much as the random backoff count. The random backoff count is a pseudo-random integer value and the value is selected from among values uniformly distributed in a range of [0 CW]. In this case, the CW stands for 'contention window'.

A CW parameter selects a CWmin value as an initial value. If transmission fails, the CWmin value becomes twice the initial value. For example, if it fails to receive an ACK response in response to a transmitted data frame, it may consider it as a collision. If a CW value has a CWmax value, the CWmax value is maintained until data transmission is succeeded. The CW value is reset to the CWmin value when the data transmission is succeeded. In this case, in order to conveniently implement and operate the CW, the CWmin, and the CWmax, it is preferable to configure the CW, the CWmin, and the CWmax to be maintained by 2n−1.

Meanwhile, if a random backoff procedure starts, an STA selects a random backoff count from among a range of [0 CW] and continuously monitors a medium while a backoff slot is countdown. If the medium is switched to a busy state, the STA temporarily stops countdown. If the medium is switched back to the idle, the STA resumes countdown of the backoff slot.

Referring to FIG. 6, many STAs intend to transmit data. In case of an STA 3, since a medium was idle as much as a DIFS, the STA 3 immediately transmits a data frame and the rest of STAs wait until the medium becomes idle. Since the medium was busy for a while, a plurality of STAs are waiting for a chance of using the medium. Hence, each of a plurality of the STAs selects a random backoff count. In this case, FIG. 6 shows a case that an STA 2, which has selected a smallest backoff count, transmits a data frame.

After the transmission of the STA 2 is finished, the medium becomes idle again and the STAs resume countdown for the temporarily stopped backoff interval. Referring to FIG. 6, although an STA 5, which has a next smallest random backoff count value and temporarily stopped countdown when the medium is busy, count downs the remaining backoff slot and transmits a data frame, it is overlapped with a random backoff count value of an STA 4 by chance. It is able to see that a collision occurs. In this case, since both the STA 5 and the STA 4 are unable to receive an ACK response in response to a transmitted data, the STAs select a random backoff count value again after CW is increased as much as twice.

As mentioned in the foregoing description, the most fundamental principle of the CSMA/CA is carrier sensing. A terminal is able to use physical carrier sensing and virtual carrier sensing to determine whether or not a DCF medium is busy/idle. The physical carrier sensing is performed at a PHY (physical layer) and the physical carrier sensing is performed through energy detection or preamble detection. For example, if it is determined as a receiving end has measured a power level or has read a preamble, it can be considered as a medium is busy. The virtual carrier sensing is performed by setting a Network Allocation Vector (NAV) to make other STAs not transmit data. The virtual carrier sensing is performed through a duration field value of a MAC header. Meanwhile, in order to reduce possibility of collision, a robust collision detection mechanism has been introduced. The reason for the introduction of the robust collision detection mechanism can be checked by two examples described in the following. For clarity, assume that a carrier sensing range is identical to a transmission range.

Figure 7:
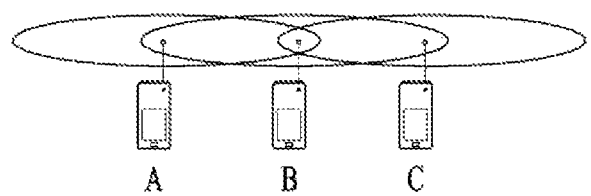
FIGS. 7 and 8 are exemplary diagrams describing problems encountered with a conventional collision resolution mechanism.
Figure 8:
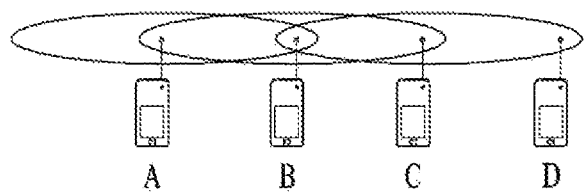

FIGS. 7 and 8 are view illustrating exemplary problems of a conventional collision resolution mechanism.

Specifically, FIG. 7 is a view illustrating hidden node issues. The present example shows a case that an STA A is communicating with an STA B and an STA C has information to be transmitted. Specifically, when the STA A transmits information to the STA B, since the STA C is out of transmission range of the STA A at the time of performing carrier sensing on a medium before transmitting data to the STA B, the STA C is unable to detect a signal transmitted by the STA A and there is a possibility that the medium is considered as being in an idle state. As a result, since the STA B receives information of the STA A and information of the STA C at the same time, a collision occurs. In this case, the STA A can be regarded as a hidden node of the STA C.

Meanwhile, FIG. 8 is a view illustrating exposed node issues. Currently, the STA B transmits data to the STA A. In this case, when the STA C performs carrier sensing, since the STA B is in a state of transmitting information, the carrier sensing shows a result that a medium is busy. As a result, although the STA C wants to transmit data to an STA D, since the media is sensed as busy, the STA C may unnecessarily wait until the medium becomes idle. In particular, although the STA A is located at the outside of a CS range of the STA C, the STA A may block information transmission of the STA C. In this case, the STA C becomes an exposed node of the STA B.

In order to make good use of a collision avoidance mechanism in the aforementioned situation, it may be able to introduce such a short signaling packet as RTS (request to send), CTS (clear to send), and the like. In particular, it may be able to use the short signaling packet to enable surrounding STAs to overhear whether or not two STAs transmit information. In particular, if an STA intending to transmit data transmits an RTS frame to an STA receiving the data, the receiving end STA can inform surrounding terminals that the receiving end STA is going to receive data by transmitting a CTS frame to the surrounding terminals.

Figure 9:
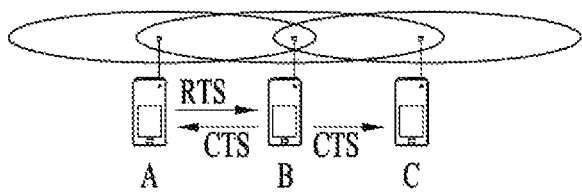
FIG. 9 is a diagram illustrating a mechanism of solving a hidden node issue using a Ready To Send (RTS)/Clear To Send (CTS) frame.

FIG. 9 is a diagram for explaining a mechanism of solving a hidden node issue using an RTS/CTS frame.

Referring to FIG. 9, both the STA A and the STA C intend to transmit data to the STA B. If the STA A sends RTS to the STA B, the STA B sends CTS to both the STA A and the STA C located near the STA B. As a result, the STA C waits until data transmission between the STA A and the STA B is finished. By doing so, it is able to avoid a collision.

Figure 10:
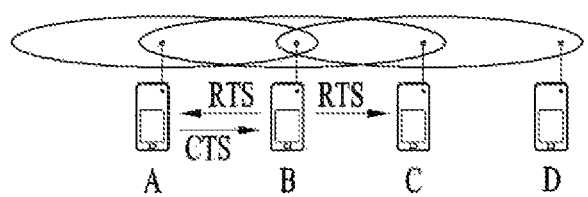
FIG. 10 is a diagram illustrating a mechanism of solving an exposed node issue using an RTS/CTS frame.

FIG. 10 is a view illustrating a mechanism of solving an exposed node issue using an RTS/CTS frame.

Referring to FIG. 10, the STA C overhears RTS/CTS transmission between the STA A and the STA B. By doing so, although the STA C transmits data to a different STA D, the STA C is able to know that a collision does not occur. In particular, the STA B transmits RTS to all terminals located near the STA B and transmits CTS to the STA A only to which data is to be practically transmitted. Since the STA C receives the RTS and does not receive the CTS of the STA A, the STA C is able to know that the STA A is located at the outside of a CS range of the STA C.

Figure 11:
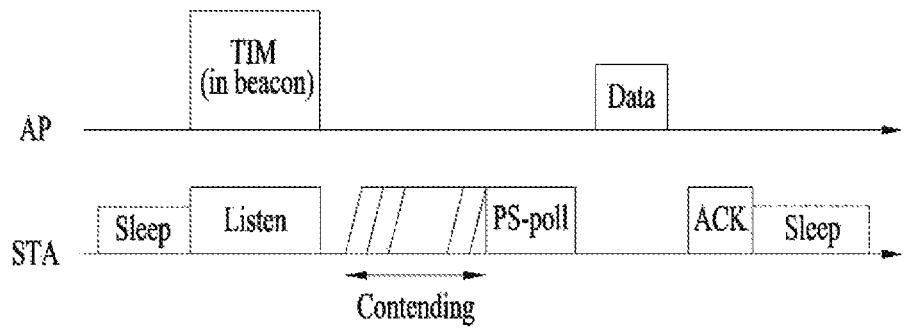
FIGS. 11 to 13 are detailed diagrams illustrating an operation of a station that has received TIM.
Figure 12:
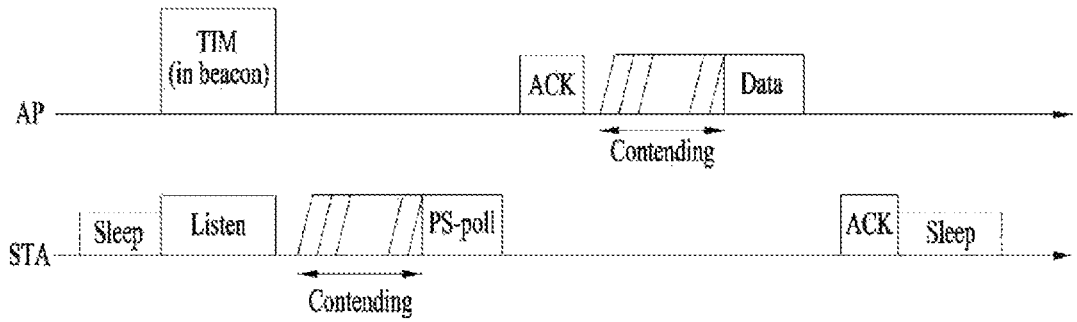
Figure 13:
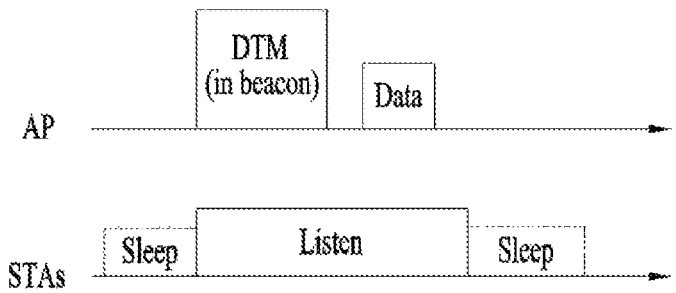
Figure 14:
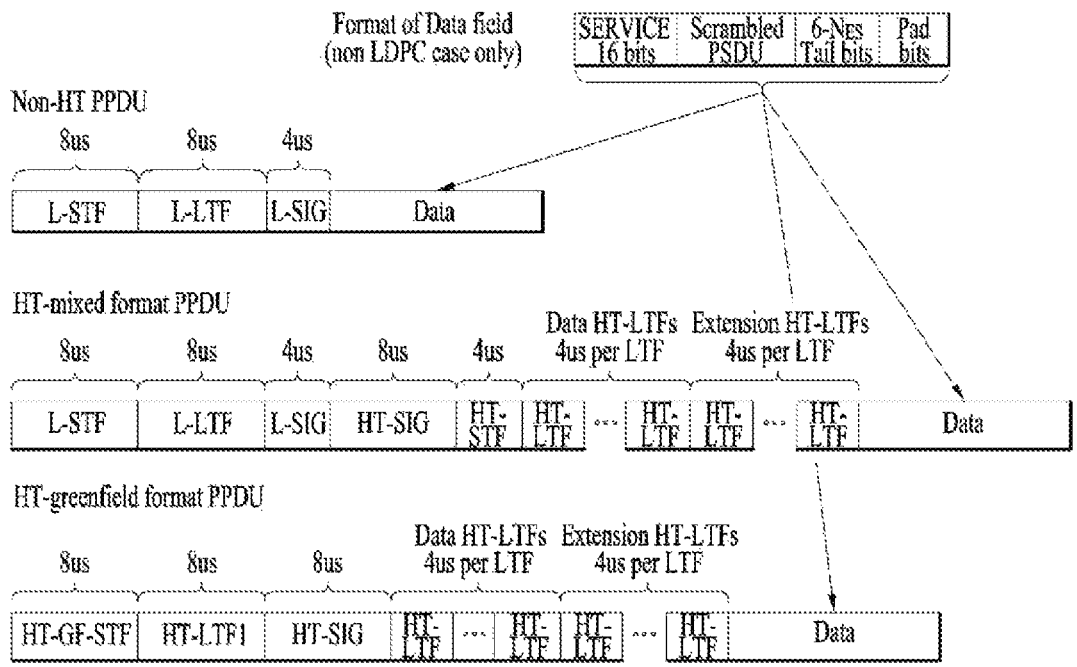

FIGS. 11 to 13 are views illustrating an operation of an STA which has received TIM.

Referring to FIG. 11, an STA switches to an awake state from a sleep state to receive a beacon frame including a TIM from an AP and interprets the received TIM element. By doing so, the STA is able to know there is a buffered traffic to be transmitted to the STA. The STA performs contending with other STAs to access a medium for transmitting a PS-poll frame and may be then able to transmit the PS-poll frame to request data frame transmission to the AP. Having received the PS-poll frame transmitted by the STA, the AP can transmit a frame to the STA. The STA receives a data frame and may be able to transmit a confirmation response (ACK) to the AP in response to the data frame. Subsequently, the STA can switch back to the sleep state.

As shown in FIG. 11, having received the PS-poll frame from the STA, the AP may operate according to an immediate response scheme that a data frame is transmitted after prescribed time (e.g., SIFS (short-inter-frame space)). Meanwhile, after the AP receives the PS-poll frame, if the AP fails to prepare a data frame to be transmitted to the STA during SIFS time, the AP may operate according to a deferred response scheme. Regarding this, it is explained in the following with reference to FIG. 12.

In the example shown in FIG. 12, similar to the example of FIG. 11, the STA switches to the awake state from the sleep state, receives a TIM from the AP, performs contending with other STAs, and transmits the PS-poll frame to the AP. If the AP fails to prepare a data frame during an SIFS after the PS-poll frame is received, the AP can transmit an ACK frame instead of the data frame to the STA. If the data frame is ready after the ACK frame is transmitted, the AP can transmit the data frame to the STA after contending is performed. The STA transmits an ACK frame to the AP to indicate that the data frame is successfully received and can switch back to the sleep state.

FIG. 13 illustrates an example in which the AP transmits a DTIM. Stations can switch to the awake state from the sleep state to receive a beacon frame including a DTIM element from the AP. Having received the DTIM, the STAs are able to know that a multicast/broadcast frame is to be transmitted. After the beacon frame including the DTIM is transmitted, the AP can immediately transmit data (i.e., the multicast/broadcast frame) without an operation of transmitting and receiving a PS-poll frame. Flaying received the beacon frame including the DTIM, the STAs receive data while continuously maintaining the awake state and may be able to switch back to the sleep state after the data reception is completed.

FIGS. 14 to 18 are views illustrating exemplary frame structures used in an IEEE 802.11 system.

An STA can receive a Physical Layer Convergence Protocol (PLCP) Packet Data Unit (PPDU). In this case, a PPDU frame format can be configured in a manner of including a Short Training Field (STF), a Long Training Field (LTF), a SIGnal (SIG) field, and a data field. In this case, as an example, the PPDU frame format can be configured based on a type of the PPDU frame format.

As an example, a non-High Throughput (non-HT) PPDU frame format can be configured by a Legacy-STF (L-STF) field, a Legacy-LTF (L-LTF) field, an SIG field, and a data field only.

And, the type of the PPDU frame format can be configured by either a HT-mixed format PPDU or a HT-greenfield format PPDU. In this case, the aforementioned PPDU format can further include an additional (a different type of) STF, LTF, and an SIG field between the SIG field and the data field.

Figure 15:
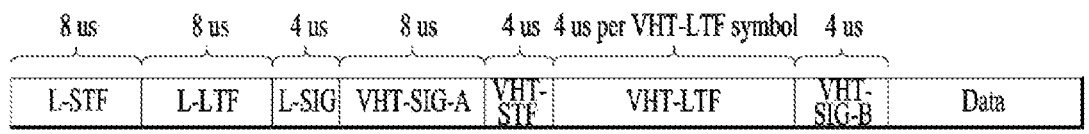

Referring to FIG. 15, it may be able to configure a Very High Throughput (VHT) PPDU format. In this case, the VHT PPDU format can also further include an additional (a different type of) STF, LTF, and an SIG field between the SIG field and the data field. More specifically, the VHT PPDU format can include at least one of a VHT-SIG-A field, a VHT-STF field, a VHT-LTF field, and a VHT-SIG-B field between the L-SIG field and the data field.

In this case, the STF may correspond to a signal for signal detection, Automatic Gain Control (AGC), diversity selection, minute time synchronization, and the like. And, the LTF may correspond to a signal for channel estimation, frequency error estimation, and the like. In this case, both the STF and the LTF can be referred to as a PCLP preamble. The PCLP preamble may correspond to a signal for OFDM physical layer synchronization and channel estimation.

Figure 16:
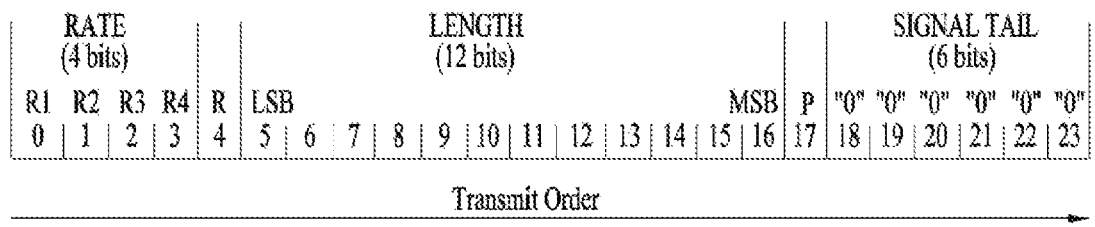

Referring to FIG. 16, the SIG field can include a RATE field, a LENGTH field, and the like. The RATE field can include information on modulation and a coding rate of a data. The LENGTH field can include information on a data length. In addition, the SIG field can include a parity bit, an SIG TAIL bit, and the like.

The data field can include a SERVIVE field, a PSDU (PLCP service data unit), a PPDU TAIL bit. If necessary, the data field can further include a padding bit.

Figure 17:
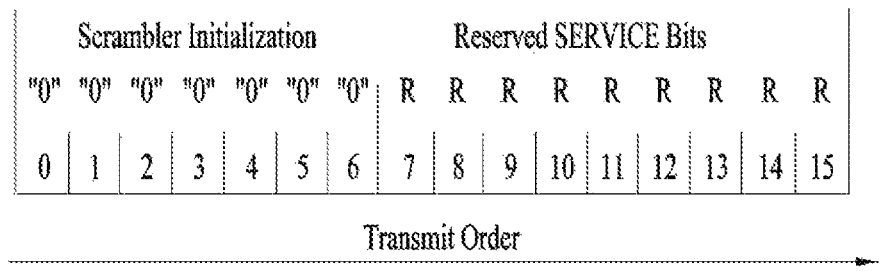

In this case, referring to FIG. 17, a partial bit of the SERVICE field can be used for synchronization of a descrambler in a receiving end and a partial bit can be configured by a reserved bit. The PSDU corresponds to a MAC Protocol Data Unit (PDU) defined in a MAC layer and can include data generated/used in a higher layer. The PPDU TAIL bit can be used for returning an encoder to a zero state. The padding bit can be used for matching a length of a data field with a prescribed unit.

And, as mentioned in the foregoing description, the VHT PPDU format can include an additional (or a different type of) STF, LTF, and an SIG field. In this case, L-STF, L-LTF, and L-SIG may correspond to a part of non-VHT in the VHT PPDU. In this case, VHT-SIG A, VHT-STF, VHT-LTF, and VHT-SIG may correspond to a part of VHT in the VHT PPDU. In particular, a field for the non-VHT and a region for the VHT field can be respectively defined in the VHT PPDU. In this case, as an example, the VHT-SIG A can include information for interpreting the VHT PPDU.

In this case, as an example, referring to FIG. 18, the VHT-SIG A can be configured by VHT SIG-A1 (FIG. 18 (a)) and VHT SIG-A2 (FIG. 18 (b)). In this case, each of the VHT SIG-A1 and the VHT SIG-A2 can be configured by 24 data bits and the VHT SIG-A1 can be transmitted prior to the VHT SIG-A2. In this case, the VHT SIG-A1 can include a BW field, an STBC field, a group ID field, an NSTS/partial AID field, a TXOP_PS_NOT_ALLOWED field, and a reserved field. And, the VHT SIG-A2 can include a short GI field, a short GI NSYM disambiguation field, an SU/MU[0] coding field, an LDPC extra OFDM symbol field, an SU VHT-MCS/MU[1-3] coding field, a beamformed field, a CRC field, a tail field, and a reserved field. Through the aforementioned fields, it may be able to check information on the VHT PPDU.

FIGS. 19, 20, and 21 are views illustrating a MAC frame format.

An STA may receive a PPDU in one of the above-described PPDU formats. A PSDU in a data part of the PPDU frame format may include a MAC PDU. The MAC PDU may be defined in various MAC frame formats, and a basic MAC frame may include a MAC header, Frame Body, and Frame Check Sequence (FCS).

For example, referring to FIG. 19, the MAC header may include Frame Control, Duration/ID, Addresses, Sequence Control, QoS Control, and HT Control. In the MAC header, the Frame Control field may include control information required for frame transmission/reception. The Duration/ID field may be set to a time required to transmit the frame. The Address fields may include identification information about a transmitter and a receiver, which will be described later. For the Sequence Control, QoS Control, and HT Control fields, refer to the IEEE 802.11 standard specifications.

For example, the HT Control field may be configured in two types, HT variant and VHT variant, and include different information according to the types. Referring to FIGS. 20 and 21, a VHT subfield of the HT Control field may indicate whether the HT Control field is the HT-variant type or the VHT-variant type. For example, if the VHT subfield is set to '0', the HT Control field may be the HT-variant type, and if the VHT subfield is set to '1', the HT Control field may be the VHT-variant type.

For example, referring to FIG. 20, if the HT Control field is the HT-variant type, the HT Control field may include Link Adaptation Control, Calibration Position, Calibration Sequence, CSI/Steering, FIT NDP Announcement, AC constraint, RDG/More PPDU, and Reserved fields. For example, referring to (b) of FIG. 20, the Link Adaptation Control field may include TRQ, MAI, MFSI, and MFB/ASELC. For more details, refer to the IEEE 802.11 standard specifications.

For example, referring to FIG. 21, if the FIT Control field is the VHT-variant type, the HT Control field may include MRQ, MSI, MFSI/GID-LM, MFB GID-H, Coding Type, FB Tx Type, Unsolicited MFB, AC constraint, RDG/More PPDU, and Reserved fields. For example, referring to (b) of FIG. 21, the MFB field may include VHT N_STS, MCS, BW, and SNR.

FIG. 22 is a view illustrating a Short MAC frame format. A MAC frame may be configured as a Short MAC frame by reducing unnecessary information when needed, to prevent waste of radio resources. For example, referring to FIG. 22, the MAC header of a Short MAC frame may always include a Frame Control field, an A1 field, and an A2 field. The MAC header may selectively include a Sequence Control field, an A3, and an A4 field. Since information unnecessary for a MAC frame is not included in a Short MAC frame in this manner, radio resources may be conserved.

For example, the Frame Control field of the MAC header may include Protocol Version, Type, PTID/Subtype, From DS, More Fragment, Power Management, More Data, Protected Frame, End of Service Period, Relayed Frame, and Ack Policy. For a description of each subfield of the Frame Control field, refer to the IEEE 802.11 standard specifications.

Meanwhile, the Type field of the Frame Control field in the MAC header may be 3 bits with value 0 to value 3 providing address information and value 4 to value 7 being reserved. New address information may be provided using the reserved values in the present disclosure, which will be described later.

In the Frame Control field of the MAC header, the From DS field may be 1 bit.

Each of the More Fragment, Power Management, More Data, Protected Frame, End of Service Period, Relayed Frame, and Ack Policy fields may be configured in 1 bit. The Ack Policy field may provide ACKnowledgement/Negative ACKnowledgement (ACK/NACK) information in 1 bit.

Regarding STAs using a frame constructed in the above-described format, an AP VHT STA may support a non-AP VHT STA operating in a Transmit Opportunity (TXOP) power save mode in a BSS. For example, the non-AP VHT STA may operate in the TXOP power save mode in an awake state. The AP VHT STA may switch the non-AP VHT STA to a doze state during a TXOP. For example, the AP VHT STA may command the non-AP VHT STA to switch to the doze state by transmitting a VHT PPDU with a TXVECTOR parameter, TXOP_PS_NOT_ALLOWED set to 0. Parameters in TXVECTOR transmitted along with the VHT PPDU by the AP VHT STA may be changed from 1 to 0 and maintained during the TXOP. Therefore, power may be saved during the remaining TXOP.

On the contrary, if TXOP_PS_NOT_ALLOWED is set to 1 and thus power saving is not performed, the parameters in TXVECTOR may be kept unchanged.

For example, as described before, the non-AP VHT STA may switch to the doze state in the TXOP power save mode during a TXOP, if the following conditions are satisfied.

A VHT MU PPDU is received, and the STA is not indicated as a group member by an RXVECTOR parameter, Group_ID.

An SU PPDU is received, and an RXVECTOR parameter, PARTIAL_AID is not 0 or does not match the partial AID of the STA.

Although the STA determines that the RXVECTOR parameter, PARTIAL_AID matches the partial AID of the STA, a receiver address of the MAC header does not match the MAC address of the STA.

Although the RXVECTOR parameter, Group_ID indicates that the STA is a group member, an RXVECTOR parameter, NUM$_{13}$ STS is set to 0.

A VHT NDP Announcement frame is received, and the RXVECTOR parameter, PARTIAL_AID is set to 0 and does not match the AID of an Info field for the STA.

The STA receives a frame with More Data set to 0 and Ack Policy set to No Ack, or transmits an ACK with Ack Policy set to a value other than No Ack.

The AP VHT STA may include a Duration/ID value set to the remaining TXOP interval and a NAV-SET Sequence (e.g., Ready To Send/Clear To Send (RTS/CTS)). Herein, the AP VHT STA may not transmit a frame to the non-AP VHT STA switching to the doze state based on the above-described conditions during the remaining TXOP.

For example, if the AP VHT STA transmits a VHT PPDU with the TXVECTOR parameter, TXOP_PS_NOT_ALLOWED set to 0 in the same TXOP and does not want the STA to switch from the awake state to the doze state, the AP VHT STA may not transmit a VHT SU PPDU.

For example, the AP VHT STA may not transmit a frame to a VHT STA that has switched to the doze state before timeout of a NAV set at the start of a TXOP.

If the AP VHT STA fails to receive an ACK after transmitting a frame including at least one of a MAC Service Data Unit (MSDU), an Aggregated-MSDU (A-MSDU), and a MAC Management Protocol Data Unit (MMPDU), with More Data set to 0, the AP VHT STA may retransmit the frame at least once in the same TXOP. For example, if the AP VHT STA fails to receive an ACK for a retransmission in the last frame of the same TXOP, the AP VHT STA may retransmit the frame after waiting until the next TXOP.

For example, the AP VHT STA may receive a Block Ack frame from a VHT STA operating in the TXOP power save mode. The Block Ack frame may be a response to an A-MPDU including an MPDU with More Data set to 0. Herein, the AP VHT STA is in the doze state and may not receive a response to the sub-sequence of a retransmitted MPDU during the same TXOP.

Further, a VHT STA that has operated in the TXOP power save mode and switched to the doze state may activate a NAV timer while it stays in the doze state. For example, upon expiration of the timer, the VHT STA may transition to the awake state.

Further, the STA may contend for medium access, upon expiration of the NAV timer.

• HE PPDU

Figure 23A:
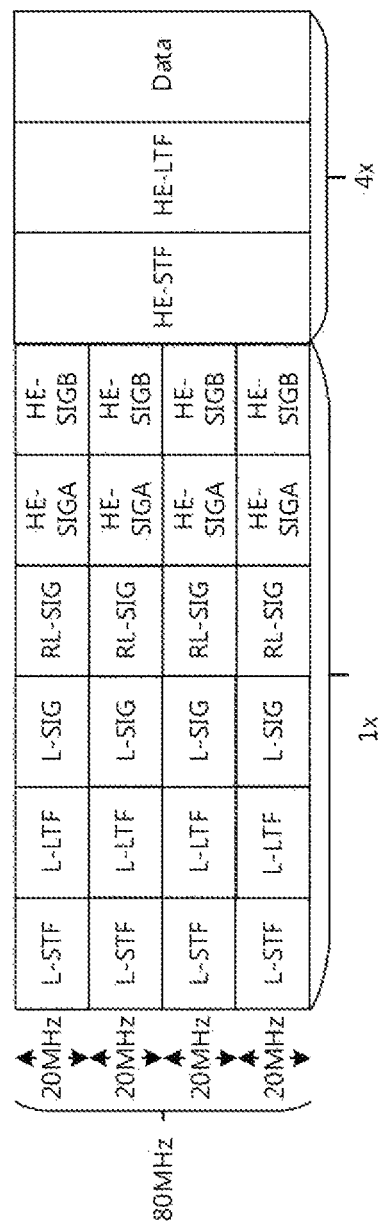
FIG. 23A is a diagram illustrating an example of a high efficiency (HE) PPDU format.

FIG. 23A is a diagram illustrating an example of a high efficiency (HE) PPDU format. The HE PPDU format may be used on the IEEE 802.11ax system. As described above, since the type of the PPDU format may be set in various manners, the scope of the present invention is not limited to the HE PPDU of FIG. 23A. For convenience of description, although FIG. 23 illustrates a HE PPDU format set in a unit of 20 MHz on a bandwidth of 80 MHz, the HE PPDU may be transmitted on a bandwidth of 20 MHz, 40 MHz or 160 MHz.

Referring to FIG. 23A, the HE PPDU includes L part (L-STF, L-LTF, L-SIG, RL-SIG) and HE part (HE-SIG-A, HE-STF, HE-LTF, HE-SIG-B). L-STF, L-LTF, L-SIG, RL-SIG, HE-SIG-A and HE-SIG-B may be set in a unit of 1× symbol (3.2 us), and HE-STF, HE-LTF and Data may be set in a unit of 4× symbol (12.8 us).

In the L part, a legacy preamble is transmitted. The L part may be transmitted in a frequency domain in a unit of 20 MHz. If a bandwidth is greater than 20 MHz, the L part may be transmitted by duplication in a unit of 20 MHz. L-SIG includes packet length information. RL-SIG is a field where L-SIG is repeatedly transmitted to improve reliability of L-SIG.

HE-SIG-A may be transmitted in a unit of 20 MHz in the same manner as the L part. If a bandwidth is greater than 20 MHz, HE-SIG-A may be transmitted by duplication in a unit of 20 MHz. HE-SIG-A may include common control information of multi-users. Contents of common control information included in HE-SIG-A may be determined depending on the type of the PPDU. For example, in case of SU PPDU, HE-SIG-A may include at least one of a format indicator, a TXOP duration, a BSS color field, a DCM (dual carrier modulation) indicator, a UL/DL flag, a bandwidth, a payload GI (guard interval), a PE, a MCS, coding, LTE compression, NSTS (Number of Spatial Streams), STBC, beamforming, CRC (cyclic redundancy check), and a Tail field. In case of MU DL PPDU, HE-SIG-A may include at least one of a format indicator, a TXOP duration, a BSS color field, a DCM indicator, the number of HE-SIG-B field symbols, MCS of HE-SIG-B field, CRC and Tail field. Also, in case of MU UL PPDU, HE-SIG-A may include at least one of a format indicator, a TXOP duration, a BSS color field, a DCM indicator, CRC and Tail field. The aforementioned types of information of the HE-SIG-A field may be joint-encoded.

FIG. 23B is a diagram illustrating a HE-SIG-B field structure of HE PPDU. FIG. 24 illustrates, but not limited to, bandwidths of 40 MHz, 80 MHz and 160 MHz, and the HE-SIG-B field may be transmitted in a unit of 20 MHz. The number of OFDM symbols of the HE-SIG-B field is varied.

If the bandwidth is not greater than 20 MHz, one HE-SIG-B field is transmitted.

If the bandwidth is greater than 20 MHz, each of channels of 20 MHz transmit any one of an odd type HE-SIG-B and an even type HE-SIG-B. For example, the odd type HE-SIG-B and the even type HE-SIG-B may be transmitted alternately. The odd numbered 20 MHz channel transmits the odd type HE-SIG-B, and the even numbered 20 MHz channel transmits the even type HE-SIG-B. In more detail, in case of 40 MHz bandwidth, the odd type HE-SIG-B is transmitted on the first 20 MHz channel, and the even type HE-SIG-B is transmitted on the second 20 MHz channel. In case of 80 MHz bandwidth, the odd type HE-SIG-B is transmitted on the first 20 MHz channel, the even type HE-SIG-B is transmitted on the second 20 MHz channel, the same odd type HE-SIG-B is transmitted on the third 20 MHz channel, and the same even type HE-SIG-B is transmitted on the fourth 20 MHz channel. Similarly, transmission is performed even in case of 160 MHz.

In this way, HE-SIG-B may be transmitted repeatedly as the size of the bandwidth is increased. The HE-SIG-B which is repeatedly transmitted may be transmitted by frequency hopping as much as 20 MHz from the 20 MHz channel to which the same type HE-SIG-B is transmitted.

Meanwhile, contents of each of the odd type HE-SIG-B may be different from those of each of the even type HE-SIG-B. However, the odd type HE-SIG-B fields have the same contents. Likewise, the even type HE-SIG-B fields have the same contents.

According to one embodiment, the odd type HE-SIG-B may be configured to include only resource allocation information on odd numbered 20 MHz channels, and the even type HE-SIG-B may be configured to include only resource allocation information on even numbered 20 MHz channels. Unlike this embodiment, according to another embodiment of the present invention, the odd type HE-SIG-B may include resource allocation information on at least a part of the even numbered 20 MHz channels, and the even type HE-SIG-B may include resource allocation information on at least a part of the odd numbered 20 MHz channels.

The HE-SIG-B may include user specific information. For example, the user specific information may include, but not limited to, at least one of station AID, resource allocation information (e.g., allocation size), MCS per STA for DL-OFDMA PPDU, NSTS, coding, STBC and transmission beamforming information.

In more detail, the HE-SIG-B may include a common field and a user specific field. The common field may be prior to the user specific field. The common filed includes information on all of STAs designated to receive PPDU at a corresponding bandwidth. The common field may include resource unit allocation information. The same common field is applied between the odd type HE-SIG-Bs. Likewise, the same common field is applied between the even type HE-SIG-Bs. For example, when four 20 MHz channels constituting 80 MHz are divided into LL, LR, RL and RR, a common block for LL and RL may be included in the common field of the odd type HE-SIG-B, and a common block for LR and RR may be included in the common field of the even type HE-SIG-B.

The user specific field may include a plurality of sub fields. The sub fields may include information specific for individual STA designated to receive PPDU. The common field and the user specific field may be identified from each other in a unit of bit not OFDM symbol.

Figure 23C:
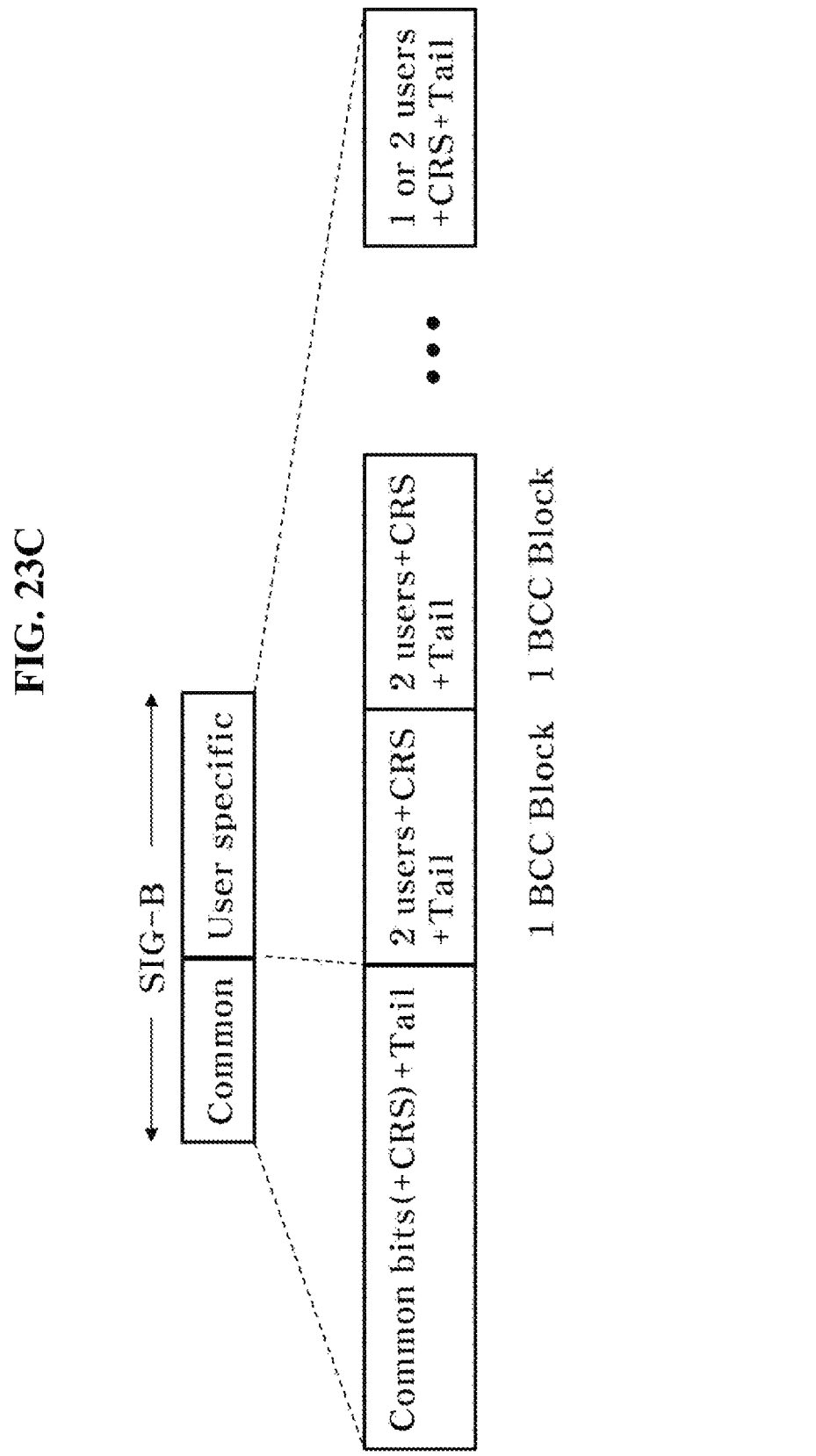
FIG. 23C is a diagram illustrating an encoding structure of HE-SIG_b.

FIG. 23C illustrates an encoding structure of HE-SIG-B according to one embodiment of the present invention. Referring to FIG. 23C, information on 2 users is joint-encoded per BCC block excluding the last BCC (Binary Convolution Code) in the user specific field. The joint-encoded information on the users may include, but not limited to, at least one of STA ID, information (e.g., NSTS, transmission beamforming, MCS and Coding) on single user allocation of RU, and each user information (e.g., Spatial Configuration field, MCS, Coding) on multi-user allocation of RU.

Meanwhile, according to still another embodiment of the present invention, information on 3 or more users may be joint-encoded. Also, attachment of CRC may be performed per user, user group, or block. Also, CRC may be attached or omitted to the common block in accordance with the embodiment.

Also, although FIG. 23C illustrates that user information is not included in the common block, according to further still another embodiment, user information may be included in the common block such that the common block may have the same size as that of the other BCC block.

• MU Transmission

FIG. 24 is a diagram illustrating a method for performing uplink multi-user (UL MU) transmission in an AP station and a non-AP station.

As described above, the AP may transmit a signal by acquiring TXOP accessible to a medium and reserving the medium through contention. At this time, referring to FIG. 24, the AP station may transmit a trigger frame to a plurality of stations to perform UL MU transmission. At this time, as an example, the trigger frame may include a resource allocation position and size as UL MU allocation information, IDs of stations, MCS, MU type (=MIMO, OFDMA), etc. That is, the AP station may be a frame that transmits a trigger frame to a plurality of stations to allow the plurality of stations to perform uplink data transmission. At this time, as an example, the plurality of stations may transmit data to the AP, after the passage of SIFS, based on a format indicated by the trigger frame. Afterwards, the AP may transmit ACK/NACK information to the station, whereby UL MU transmission may be performed.

FIG. 25 is a diagram illustrating an A-MPDU (Aggregate-MPDU) frame structure for UL MU transmission. In UL MU transmission, a plurality of stations may perform data transmission at the same time by respectively receiving their resource allocation information. To this end, an A-MPDU format may be used. In more detail, referring to FIG. 25(a), the A-MPDU may include a plurality of A-MPDU subframe fields and EOF (End of Frame) pad fields. At this time, information on each of the plurality of stations may be delivered through each A-MPDU subframe. At this time, as an example, referring to FIG. 25(b), the A-MPDU subframe may include an MPDU delimiter, MPDU and PAD fields. Also, as an example, referring to FIG. 25(c), the MPDU delimiter field may include EOF, MPDU length, CRC, Delimiter Signature and Reserved fields.

For example, the EOF field may include 1 bit. At this time, the EOF field may be a field indicating whether the corresponding subframe is the last of the frame. At this time, as an example, the A-MPDU subframe of which MPDU length field is set to 0 and EOF is set to 1 cannot be arranged prior to another A-MPDU subframe of which EOF is set to 0. That is, the A-MPDU subframe of which MPDU length field is set to 0 and EOF is set to 1 may be the last A-MPDU subframe of the frame.

Also, the MPDU length field may be a field indicating a length of MPDU. At this time, if the MPDU length field is set to 0, MPDU may not exist. Also, as an example, the A-MPDU subframe of which MPDU length field is set to 0 may be used to indicate start or end frame.

Also, the Delimiter Signature field may be formed in an independent pattern to search for MPDU delimiter. That is, the Delimiter Signature field may be a field used to identify each A-MPDU subframe.

Hereinafter, the term STA may mean non-AP STA unless specially limited.

In the IEE 802.11ax, the AP may transmit and receive a signal to and from multiple users based on OFDMA or MU-MIMO.

Figure 26:
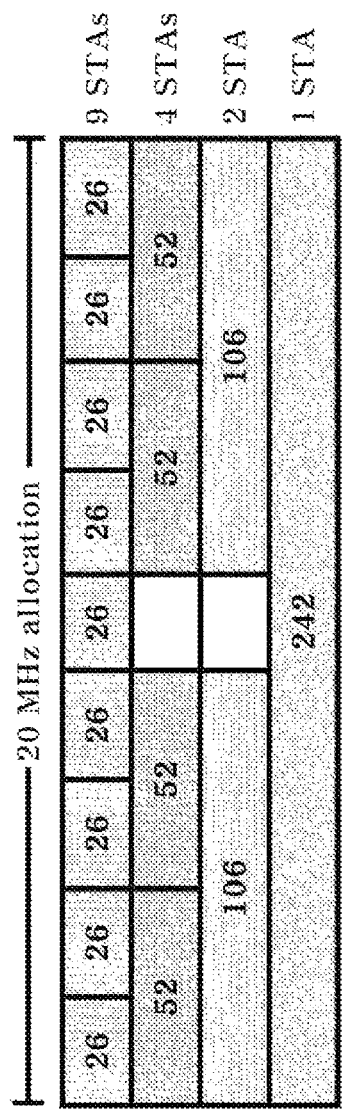
FIG. 26 is a diagram illustrating resources available at 20 MHz channel in case of signal transmission based on OFDMA.

FIG. 26 is a diagram illustrating resources available at 20 MHz channel in case of signal transmission based on OFDMA. Each numbers in blocks means the number of tones (e.g., subcarriers).

Referring to FIG. 26, in case of signal transmission based on the smallest chunk (e.g., 26 tones), STAs up to maximum 9 may be supported. In case of MU-MIMO, STAs up to maximum 8 may be supported.

• MCS for HE-SIG-B Field

MCS information on the aforementioned HE-SIG-B may be transmitted through HE-SIG-A, and MCS0 and MCS1 may be used for transmission of HE-SIG-B. According to the embodiments which will be described later, another MCS in addition MCS0 and MCS1 may be used.

Setup of MCS Set According to Channel Status

In the following embodiment, MCS of HE-SIG-B may be configured depending on the channel status. The channel status may include, but not limited to, whether STA/AP is arranged indoor or outdoor.

According to one embodiment of the present invention, MCS of HE-SIG-B may be configured depending on a transmission condition, for example, considering overhead and performance. For example, in an environment (e.g., outdoor) that a channel status is not good, HE-SIG-B may be transmitted using MCS (e.g., MCS10, MCS0, MCS1, SQPSK) lower than high MCS such that HE-SIG-B may have characteristic robust to channel and interference. Therefore, the following Robust MCS sets may be used in a poor channel (e.g., outdoor).

Robust MCS set 1={MCS10, MCS0, MCS1, SQPSK}
Robust MCS set 2={MCS10, MCS0, MCS1, MCS3}

Information (hereinafter, 'MCS indicator') on MCS used for actual HE-SIG-B among four MCSs include din Robust MCS set may be indicated by 2-bit, for example, and the corresponding 2-bit may be transmitted through HE-SIG-A.

On the other hand, in accordance with an excellent channel status, in an environment (e.g., indoor) which has a relatively high received SINR, HE-SIG-B may be transmitted using high MCS. Overhead of HE-SIG-B may be reduced and performance may be improved due to usage of high MCS. For example, the following high performance MCS sets may be used in an environment in which a channel status is excellent.

High Performance MCS set 1={MCS0, MCS1, MCS3, MCS5}
High Performance MCS set 2={MCS0, MCS1, MCS2, MCS3}

In this way, a size of High Performance MCS Set used for a good channel status may be set to be the same as that of Robust MCS set configured to transmit a preamble robust to a poor channel status. MCS indicator for the High Performance MCS set may be configured by 2-bit, and may be transmitted through HE-SIG-A.

Meanwhile, channel status classification, configuration of MCS set and size of MCS set according to the aforementioned indoor and outdoor are only exemplary for convenience of description, and the present invention is not limited to this example. For example, another size of MCS set may be configured, and MCS such as MCS0~9, MCS10 and SQPSK may be used. The size of the MCS indicator may be changed depending on the size of the MCS set.

As described above, the MCS indicator having the same value may be interpreted as a different MCS value depending on the channel status (e.g., indoor/outdoor). For example, the MCS indicator may be configured such that 'MCS indicator=00' indicates 'MCS10' in Robust MCS set 1 and indicates 'MCS0' in High Performance MCS set 1. Therefore, since the MCS indicator is interpreted depending on the channel status, the STA/AP should first determine a channel status through which a signal is transmitted, before using the MCS indicator.

Determination of Channel Status

Hereinafter, methods for identifying transmission channel statuses (e.g., indoor/outdoor) without overhead of additional preamble will be described.

(1) Identification of Channel Status Based on HE-SIG-A Repetition

In the 802.11ax system according to one embodiment of the present invention, reliability of HE-SIG-A may be improved in a poor channel status, and HE-SIG-A may be transmitted repeatedly to ensure its received performance.

Therefore, if HE-SIG-A is transmitted repeatedly, the STA/AP may determine that the channel status is poor (e.g., outdoor). Therefore, the STA/AP determines MCS for HE-SIG-B by using the Robust MCS set to transmit a robust preamble.

If HE-SIG-A is not transmitted repeatedly, the STA/AP may determine that the channel status is good. Therefore, the STA/AP may configure MCS of HE-SIG-B by using High Performance MCS set to reduce overhead for HE-SIG-B transmission and transmit a preamble having high performance.

(2) Identification of Channel Status Based on LTF Size Information Included in HE-SIGA In the 802.11ax system according to one embodiment of the present invention, two LTF sizes (i.e., 2× and 4×) are defined and used. According to 4×LTF size, LTF sequence is transmitted to all subcarriers, however, according to 2×LTF size, LTF sequence is transmitted per interval of 2 subcarriers. Generally, in a good channel status (e.g., indoor), instead of 4×LTF, 2×LTF is used to reduce preamble overhead and to obtain high performance.

Therefore, if 4×LTF is used, the STA/AP determines that the channel status is not good, and determines MCS for HE-SIG-B from the Robust MCS set to transmit a robust preamble.

On the contrary, if 2×LTF is used, the STA/AP determines that the channel status is good, and determines MCS for HE-SIG-B from the High Performance MCS set to reduce overhead and obtain high performance.

Identification of Channel Status Based on Tx Power Information Included in HE-SIG-A According to one embodiment of the present invention, intensity of power that may be used by the STA/AP may be defined differently in view of a regulation when a signal is transmitted outdoor and indoor.

Therefore, if the STA/AP transmits a signal in a poor channel status (e.g., outdoor), the STA/AP transmits a signal at a higher power to transmit a signal further away than a case that a signal is transmitted in a good channel status (e.g., indoor) or improve transmission performance.

Information on a nominal transmission power may be included in HE-SIG-A. The STA/AP may determine a status of a channel through which a signal is transmitted, for example, whether the status of the channel is indoor or outdoor, using the information on a transmission power included in the received HE-SIG-A. If the transmission power value included in HE-SIG-A is greater than a level (e.g., P_indoor) of an indoor transmission power, the STA/AP determines a poor channel status (e.g., outdoor) and configures MCS in the Robust MCS set to transmit HE-SIG-B.

On the contrary, if the transmission power value included in HE-SIG-A is a threshold value (e.g., P_indoor) of the indoor transmission power or less, the STA/AP determines a good channel status and configures MCS in the High Performance MCS set to transmit HE-SIG-B.

(4) Identification of Channel Status Based on Payload GI Information Included in HE-SIG-A In the 802.11ax system according to one embodiment of the present invention, three types of guard intervals (GI), for example, GIs of {0.8 us, 1.6 us, 3.2 us} and additional GI smaller than 0.8 us may be defined. In another embodiment of the present invention, GI information may be included in HE-SIG-B.

In a poor channel status, for example, outdoor, a long GI of 3.2 us may generally be used to reduce effect and interference on a channel. Therefore, if G1=3.2 us of data (e.g., payload) is used, the STA/AP may determine a channel (e.g., outdoor) of a poor status and configure MCS from the Robust MCS set to transmit HE-SIG-B.

On the contrary, if GI used for payload is not 3.2 us, the STA/AP may determine a channel of a good status and configure MCS from the High Performance MCS set to transmit HE-SIG-B.

(5) Identification of Channel Status Through 1-bit Indicator Indicating Polarity (+/−) of L-SIG and RL-SIG A field where L-SIG is repeated, that is, RL-SIG field may be transmitted. The STA/AP may determine a channel status through polarity of L-SIG and RL-SIG. For example, the STA/AP repeats L-SIG, and may transmit RL-SIG by multiplying RL-SIG by a 1-bit polarity indicator of '+1' or '−1'. At this time, a channel status may be indicated through '+1' or '−1'.

If the 1-bit indicator multiplied by RL-SIG indicates a first polarity, the STA/AP may select MCS from the Robust MCS Set, and if the 1-bit indicator indicates a second polarity, the STA/AP may select MCS from the High Performance MCS set.

In the same manner as the aforementioned embodiments, the SAT/AP may determine a channel status (ex., indoor/outdoor), and may indicate information on MCS set implicitly used for HE-SIG-B, by using the determined channel status.

(6) Identification of Channel Status Based on Combination of the Aforementioned Methods Also, in addition to the method for individually using information in the aforementioned embodiments, the STA/AP may determine a channel status based on combination of individual information and indicate information on MCS set used for HE-SIG-B.

(i) Combination of repeated transmission of HE-SIG-A and GI information on payload: if HE-SIG-A is repeatedly transmitted and at the same time GI of payload transmitted through HE-SIG-A is 3.2 us, the STA/AP determines that a channel status is not good, selects MCS from the Robust MCS set and transmits HE-SIG-B by using the corresponding MCS. In other case, MCS may be selected from the High Performance MCS set.

(ii) Combination of repeated transmission of HE-SIG-A, GI information on payload and LTF size information: if HE-SIG-A is repeatedly transmitted and at the same time GI of payload transmitted through HE-SIG-A is 3.2 us and LTF size is 4×LTF, the STA/AP determines that a channel status is not good, selects MCS from the Robust MCS set and transmits HE-SIG-B by using the corresponding MCS. In other case, MCS may be selected from the High Performance MCS set.

The combination methods of (i) and (ii) are examples to assist understanding of the present invention, and the channel status may be determined based on various combinations of the embodiments (1) to (5).

Also, if the aforementioned embodiments (1) to (6) are in conflict with one another, a prior condition may be defined. For example, if HE-SIG-A is repeatedly transmitted as described in the embodiment (1) but 2×LTF structure is used as described in the embodiment (2), the Robust MCS set should be used in accordance with the embodiment (1) and the High Performance MCS set should be used in accordance with the embodiment (2), whereby both sets may collide with each other. In this case, a priority of HE-SIG-A may be configured between repeated transmission and LTF structure. For example, the STA/AP may first consider the embodiment (1) and transmit HE-SIG-A by using the Robust MCS set even though the 2×LTF structure is used if HE-SIG-A is repeatedly transmitted. However, the above-described priority is intended for understanding of the present invention, and the scope of the present invention is not limited to the above-described priority.

According to the aforementioned embodiments (1) to (6), the STA/AP may previously determine a status of a channel through which HE-SIG-B is transmitted by using HE-SIG-A or RL-SIG transmitted prior to HE-SIG-A, and may implicitly indicate information on MCS set used for HE-SIG-B, whereby overhead of a preamble is not increased.

As described above, different MCS sets may be used depending on the channel status (ex., indoor/outdoor) in transmission of HE-SIG-B. Also, even though the same MCS indicator is used when HE-SIG-B is received, different MCSs may be interpreted depending on the channel status. As the MCS sets are dynamically configured depending on the channel status, received performance of HE-SIG-B may be improved and overhead of HE-SIG-B may be reduced.

Usage of Fixed MCS Set

Unlike the embodiments in which different MCS sets are used depending on the channel status, MCS set may be fixed and MCS indicated by MCS indicator may be changed depending on the channel status.

For example, it is assumed that MCS indicator is 2-bit and a fixed MCS set={MCS0, MCS1, MCS3, MCS5} is configured. If it is determined that a channel status is not good by means of the aforementioned methods for determining a channel status (e.g., Outdoor), it may be defined such that MCS5 which is the Highest MCS is recognized as MCS10. Therefore, MCS0, MCS1, and MCS3 may be indicated as the same MCS indicator value regardless of the channel status.

According to another embodiment, the MCS indicator is 2-bit but a fixed MCS set={MCS0, MCS1, MCS3, MCS5, MCS10} may be configured. In case of 'MCS indicator=11' (e.g., Highest MCS), if the channel status is good, 'MCS indicator=11' may be interpreted as MCS5, and if the channel status is poor, 'MCS indicator=11' may be interpreted as MCS10.

In this embodiment, for convenience of description, one MCS value interpreted differently depending on the channel status is exemplarily illustrated but the present invention is not limited to this example. For example, if the channel status is good, since Low MCS is more used than High MCS, MCS indicator values corresponding to MCS3 and MCS5 may be set to be recognized as MCS10 and SQPSK, respectively, whereby a robust preamble may be transmitted.

Figure 27:
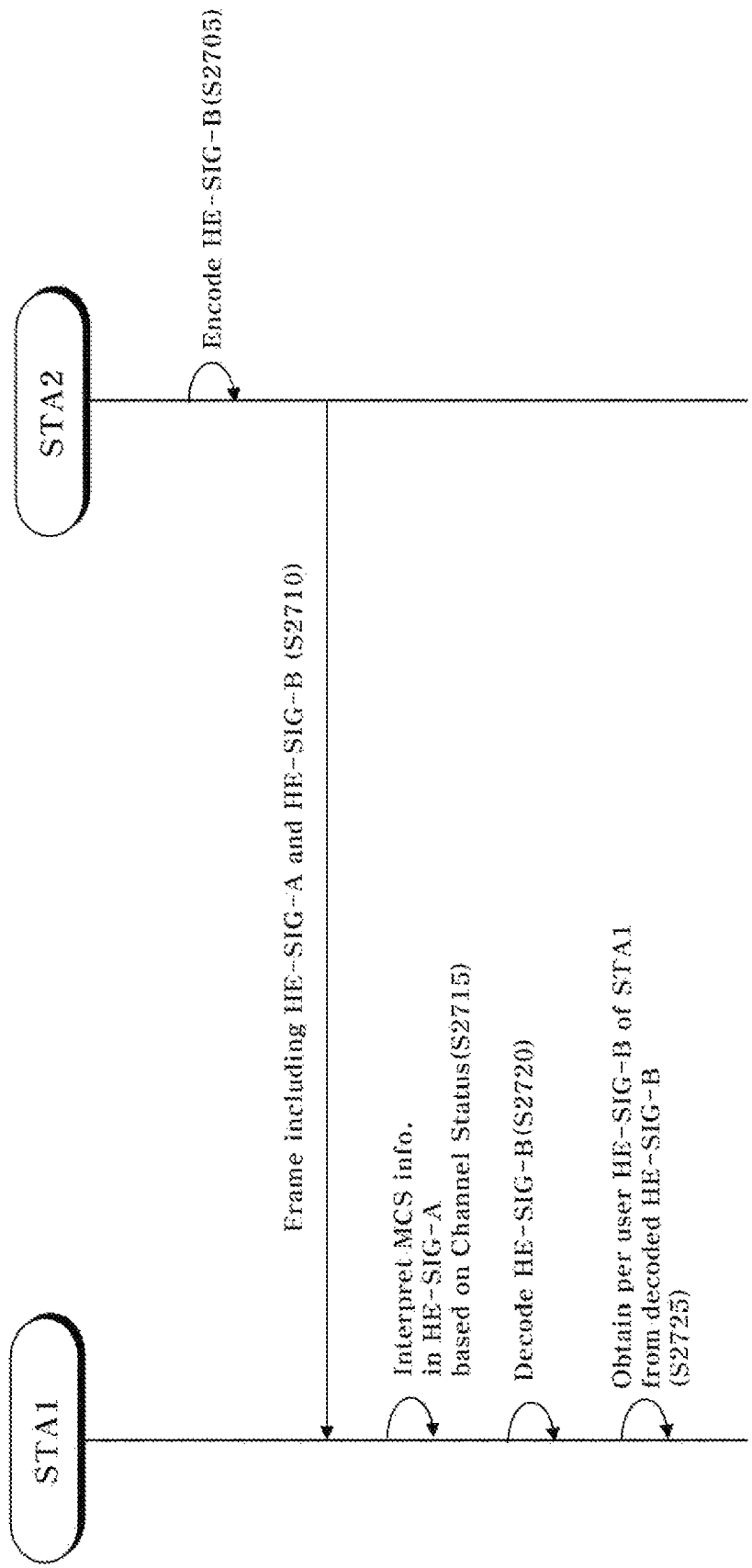
FIG. 27 is a diagram illustrating a flow of a method for signal transmission and reception according to one embodiment of the present invention.

FIG. 27 is a diagram illustrating a flow of a method for signal transmission and reception according to one embodiment of the present invention. Repeated description of the aforementioned embodiments may be omitted. A first STA may be AP STA or non-AP STA, and a second STA may also be an AP STA or non-AP STA. Also, although the first STA and the second STA are only shown to prevent description from departing from an issue point, it will be apparent to those skilled in the art that other STAs for transmitting and receiving MU frame may exist.

Referring to FIG. 27, the second STA encodes a HE-SIG-B field (S2705). The HE-SIG-B field may be encoded based on any one of a plurality of MCS sets. The MCS set and MCS level within the MCS set may be selected based on a channel status (e.g., indoor or outdoor). For example, the plurality of MCS sets may be used at their respective channel statuses different from each other. The first MCS set may be used at the first channel status, and the second MCS set may be used at the second channel status. The second STA encodes the HE-SIG-B field based on the selected MCS level, and includes MCS information on the HE-SIG-B field in the HE-SIG-B field.

The first STA receives a frame, which includes HE-SIG-A and HE-SIG-B, from the second STA (S2710). The frame may be HE PPDU that includes L-SIG, RL-SIG, HE-SIG-A, and HE-SIG-B. The SIG-A field may include information on MCS used to encode HE-SIG-B. The frame may be transmitted in, but not limited to, an OFDMA mode or MU MIMO mode.

The first STA may estimate a status of the channel in which the frame is received. The channel status may indicate an indoor status or an outdoor status. The channel status may be estimated based on at least one of repetition of SIG-A field within the frame, a length of LTF of the frame, a polarity of RL-SIG field where L-SIG field is repeated in the frame, nominal transmission power information of the frame, and a payload GI (guard interval) length of the frame. If the SIG-A field is repeated or LTF is set to four times of a unit length (e.g., 4×LTF structure), RL-SIG field has a first polarity, transmission power information exceeds an indoor power level, or the payload GI is set to one time of a unit length, the channel status may be estimated as an outdoor status. For example, the unit length may correspond to, but not limited to, 1×symbol, that is, 3.2 us.

The first STA interprets MCS information included in the SIG-A field based on the channel status (S2715). A specific value set to MCS information may indicate MCS levels which belong to their respective MCS sets different from each other. For example, a specific value of MCS information indicating the first MCS level of the first MCS set among the plurality of MCS sets may be reused to indicate the second MCS level of the second MCS set. Whether any one of the first MCS level and the second MCS level indicated by the specific value set to the MCS information has been configured in the HE-SIG-B field may be indicated implicitly by the status of the channel in which the frame is received. For example, the first channel status may be interpreted that MCS information indicates the first MCS level of the first MCS set, and the second channel status may be interpreted that the same MCS information indicates the second MCS level of the second MCS set.

As the MCS information is interpreted, the MCS level of the HE-SIG-B field is specified. The first STA decodes the HE-SIG-B field based on the MCS level for HE-SIG-B (S2720).

The first STA acquires user specific SIG-B (per user HE-SIG-B) of the first STA from the decoded HE-SIG-B field (S2725).

Figure 28:
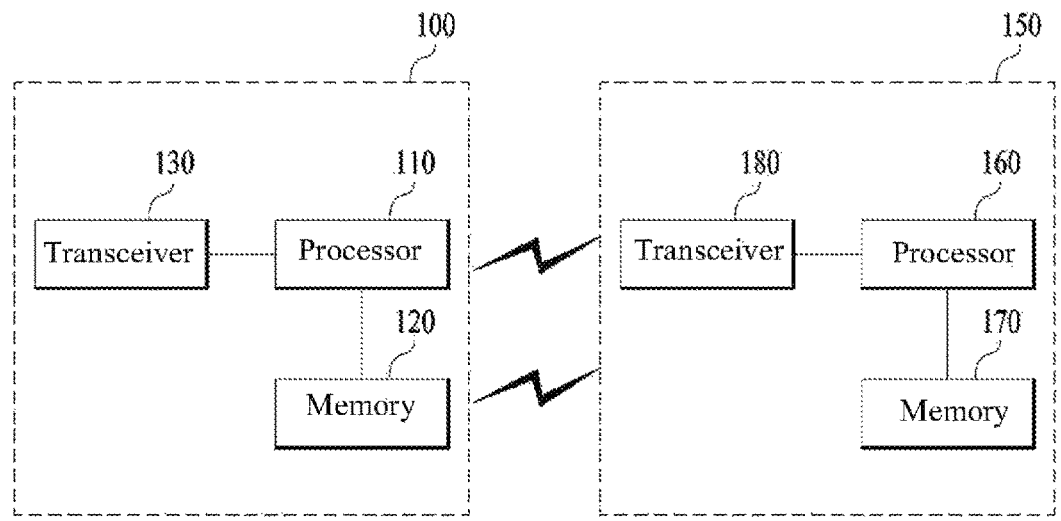
FIG. 28 is a block diagram illustrating an exemplary configuration of an AP apparatus (or base station) and a station apparatus (or UE).

FIG. 28 is a block diagram illustrating an exemplary configuration of an AP apparatus (or base station) and a station apparatus (or UE).

The AP 100 may include a processor 110, a memory 120, and a transceiver 130. The station 150 may include a processor 110, a memory 170, and a transceiver 180.

The transceiver 130 and 180 may transmit/receive a radio signal, and may implement a physical layer according to the IEEE 802 system. The processor 110 and 160 may be connected with the transceiver 130 and 180 and may implement a physical layer and/or MAC layer according to the IEE 802 system. The processor 110 and 160 may be configured to perform the operation according to one or combination of two or more of the aforementioned embodiments of the present invention. Also, a module for implementing the operation of the AP and the station according to the aforementioned embodiments of the present invention may be stored in the memory 120 and 170, and may be implemented by the processor 110 and 160. The memory 120 and 170 may be included in the processor 110 and 160 or provided outside the processor 110 and 160 and thus connected with the processor 110 and 160 by a means which is known.

The description of the aforementioned AP 100 and the station 150 may be applied to a BS and a UE in another wireless communication system (For example, LTE/LTE-A system).

The details of the aforementioned AP and the station may be configured in such a manner that the aforementioned various embodiments of the present invention may independently be applied to the AP and the station, or two or more embodiments may simultaneously be applied to the AP and the station, and repeated description will be omitted for clarification.

Figure 29:
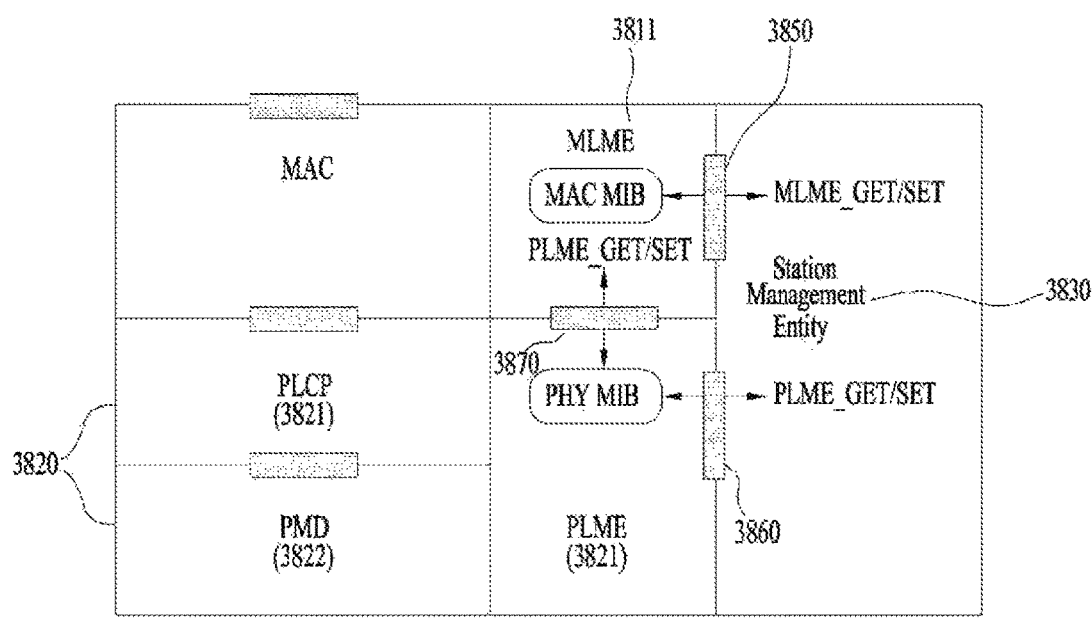
FIG. 29 is a diagram illustrating an exemplary structure of a processor of an AP or a station.

FIG. 29 is a diagram illustrating an exemplary structure of a processor of an AP or a station.

The processor of the AP or the station may have a structure of plurality of layers, and FIG. 29 intensively illustrates a MAC sublayer 3810 and a physical (PHY) layer 3820 on a DLL (data link layer) of these layers. As shown in FIG. 29, the physical layer 3820 may include a PLCP (Physical Layer Convergence Procedure) entity 3821, and a PMD (Physical Medium Dependent) entity 3822. The MAC sublayer 3810 and the PHY layer 3820 include management entities conceptually referred to as MLME (MAC sublayer Management Entity) 3811. These entities 3811 and 3821 provide a layer management service interface in which a layer management function is operated.

To provide an exact MAC operation, an SME (Station Management Entity) 3830 exists within each station. The SME 3830 is a layer independent entity that exists within a separate management plane or may be seen off to the side. Although exact functions of the SME 3830 are not described herein in detail, it may seem that this entity 3830 serves to collect layer-dependent state from various layer management entities (LME) and similarly set values of layer-specific parameters, The SME 3830 may perform these functions on behalf of a general system management entity and implement a standard management protocol.

The entities shown in FIG. 29 mutually act in various manners. FIG. 29 illustrates some examples for exchanging GET/SET primitives. XX-GET.request primitive is used to request a value of a given MIB attribute (management information based attribute information). XX-GET.confirm primitive returns a proper MIB attribute information value if Status is "success", and is used to return error indication in the Status field if not so. XX-SET.request primitive is used to request that the indicated MIB attribute is set to a given value. If the MIB attribute means a specific operation, this is to request that the corresponding operation should be performed. XX-SET.confirm primitive confirms that MIB attribute indicated if status is "success" has been set to a requested value, and is used to return an error condition to the status field if not so. If the MIB attribute means a specific operation, this is to confirm that the corresponding operation has been performed.

As shown in FIG. 29, the MLME 3811 and the SME 3830 may exchange MLME_GET/SET primitives through MLME_SAP 3850. Also, various PLCM_GET/SET primitives may be exchanged between the PLME 3821 and the SME 3830 through PLME_SAP 3860, and may be exchanged between the MLME 3811 and the PLME 3870 through MLME-PLME_SAP 3870.

The embodiments of the present invention may be implemented by various means, for example, hardware, firmware, software, or their combination.

In case of implementation based on hardware, the method according to the embodiments of the present invention may be implemented by one or more of application specific integrated circuits (ASICs), digital signal processors (DSPs), digital signal processing devices (DSPDs), programmable logic devices (PLDs), field programmable gate arrays (FPGAs), processor, controller, microcontroller, microprocessor, etc.

In case of implementation based on firmware or software, the method according to the embodiments of the present invention may be implemented in the form of module, procedure or function, which performs the above-described functions or operations. A software code may be stored in a memory unit and then driven by the processor. The memory unit is arranged inside or outside the processor, and may transmit and receive data to and from the processor by various means which are already known.

The detailed description of the preferred embodiments of the present invention is given to enable those skilled in the art to realize and implement the present invention. While the present invention has been described referring to the preferred embodiments of the present invention, those skilled in the art will appreciate that many modifications and changes can be made to the present invention without departing from the spirit and essential characteristics of the present invention. The above embodiments are therefore to be construed in all aspects as illustrative and not restrictive. Therefore, the present invention intends not to limit the embodiments disclosed herein but to give a broadest range matching the principles and new features disclosed herein. It will be apparent to those skilled in the art that the present invention may be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

In this specification, both the product invention and the method invention have been described, and description of both inventions may be made complementally if necessary.

INDUSTRIAL APPLICABILITY

As described above, the embodiments of the present invention may be applied to various wireless communication systems including the IEEE 802.11 system.

The invention claimed is:

1. A method for receiving, by a non-access point (non-AP) station (STA), a signal in a wireless local area network (LAN) system, the method comprising:
receiving, by the non-AP STA from an AP STA, a frame which includes a signal (SIG)-A field including modulation and coding scheme (MCS) information for a SIG-B field and the SIG-B field encoded based on one of a plurality of MCS sets;
decoding, by the non-AP STA, the SIG-B field based on the MCS information included in the SIG-A field; and
obtaining, by the non-AP STA, user specific information for the non-AP STA based on a result of the decoding the SIG-B field,
wherein a specific MCS indication value of the MCS information is available for both a first MCS level of a first MCS set and a second MCS level of a second MCS set of the plurality of MCS sets, and
wherein the non-AP STA determines whether the specific MCS indication value has been used as an indication of the first MCS level or has been used as an indication of the second MCS level based on a status of a channel through which the frame is received.

2. The method according to claim 1, wherein the first MCS set is used at a first channel status, and the second MCS set is used at a second channel status.

3. The method according to claim 1, further comprising:
determining whether the status of the channel is an indoor status or an outdoor status.

4. The method according to claim 1, wherein the status of the channel is estimated based on at least one of repetition of SIG-A field within the frame, a length of long training field (LTF) of the frame, a polarity of repetition legacy-signal (RL-SIG) field where L-SIG field is repeated in the frame, nominal transmission power information of the frame, and a payload guard interval (GI) length of the frame.

5. The method according to claim 4, wherein the status of the channel is estimated as an outdoor status based on determining that the SIG-A field is repeated or the LTF is set to four times of a unit length, the RL-SIG field has a first polarity, the transmission power information exceeds an indoor power level, or the payload GI is set to one time of a unit length.

6. A non-access point (non-AP) station (STA) comprising:
a receiver to receive, from an AP STA, a frame which includes a signal (SIG)-A field including modulation and coding scheme (MCS) information for a SIG-B field and the SIG-B field encoded based on one of a plurality of MCS sets; and
a processor to decode the SIG-B field based on the MCS information included in the SIG-A field and to obtain user specific information for the non-AP STA based on a result of the decoding the SIG-B field,
wherein a specific MCS indication value of the MCS information is available for both a first MCS level of a first MCS set and a second MCS level of a second MCS set of the plurality of MCS sets, and
wherein the processor determines whether the specific MCS indication value has been used as an indication of the first MCS level or has been used as an indication of the second MCS level based on a status of a channel through which the frame is received.

7. The non-AP STA according to claim 6, wherein the first MCS set is used at a first channel status, and the second MCS set is used at a second channel status.

8. The non-AP STA according to claim 6, wherein the processor determines whether the status of the channel is an indoor status or an outdoor status.

9. The non-AP STA according to claim 6, wherein the status of the channel is estimated based on at least one of repetition of SIG-A field within the frame, a length of long training field (LTF) of the frame, a polarity of repetition legacy-signal (RL-SIG) field where L-SIG field is repeated in the frame, nominal transmission power information of the frame, and a payload guard interval (GI) length of the frame.

10. The non-AP STA according to claim 9, wherein the status of the channel is estimated as an outdoor status based on determining that the SIG-A field is repeated or the LTF is set to four times of a unit length, the RL-SIG field has a first polarity, the transmission power information exceeds an indoor power level, or the payload GI is set to one time of a unit length.

* * * * *